United States Patent
Asterjadhi et al.

(10) Patent No.: US 11,805,558 B2
(45) Date of Patent: Oct. 31, 2023

(54) SYNCHRONIZED CHANNEL ACCESS COEXISTENCE

(71) Applicant: QUALCOMM Incorporated, San Diego, CA (US)

(72) Inventors: Alfred Asterjadhi, San Diego, CA (US); Lochan Verma, Danville, CA (US); George Cherian, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/064,833

(22) Filed: Dec. 12, 2022

(65) Prior Publication Data
US 2023/0108990 A1    Apr. 6, 2023

Related U.S. Application Data

(63) Continuation of application No. 16/991,943, filed on Aug. 12, 2020, now Pat. No. 11,653,394.
(Continued)

(51) Int. Cl.
*H04W 74/08*    (2009.01)
*H04W 74/00*    (2009.01)
(Continued)

(52) U.S. Cl.
CPC ... *H04W 74/0891* (2013.01); *H04W 52/0216* (2013.01); *H04W 52/0222* (2013.01);
(Continued)

(58) Field of Classification Search
CPC ......... H04W 52/0212; H04W 52/0216; H04W 52/0258; H04W 72/1205; Y02D 30/70
See application file for complete search history.

(56) References Cited

U.S. PATENT DOCUMENTS

| 2012/0113918 A1 | 5/2012 | Freda et al. |
| 2012/0120892 A1 | 5/2012 | Freda et al. |

(Continued)

OTHER PUBLICATIONS

Chao-Chun Wang (MEDAITEK): "Setting Quiet time period—text", IEEE Draft, 11-16-1238-04-00AX-Setting-Quiet-Time-Period-Text, IEEE-SA Mentor, Piscataway, Nd USA, vol. 802.11ax, No. 4, Nov. 7, 2016 (Nov. 7, 2016), pp. 1-11, XP068158483, Retrieved from the Internet: URL: https://mentor.ieee.org/802.11/dcn/16/11-16-1238-04-00ax-setting-quiet-time-period-text.docx, [retrieved on Nov. 7, 2016], p. 6-p. 11.
(Continued)

*Primary Examiner* — Liton Miah
(74) *Attorney, Agent, or Firm* — QUALCOMM INCORPORATED

(57) ABSTRACT

This disclosure provides methods, devices and systems for synchronized channel access. Some implementations more specifically relate to facilitating coexistence among wireless communication devices that support synchronized channel access and those that do not. A group of access points may schedule periodically recurring, synchronized channel access periods by periodically transmitting quiet elements. The quiet elements establish recurring quiet periods during which legacy devices are not permitted to transmit. In some implementations, an access point may transmit one or more quiet override elements each associated with a respective quiet element and indicating to other access points supporting synchronized channel access that they are permitted to contend for access during the respective quiet period. In some other implementations of synchronized channel access, an access point supporting synchronized channel access that wins contention after one or more consecutive synchronized channel access periods during which no other synchronized access points won contention, may be entitled to an extended TXOP.

12 Claims, 17 Drawing Sheets

Related U.S. Application Data

(60) Provisional application No. 62/889,919, filed on Aug. 21, 2019.

(51) Int. Cl.
*H04W 52/02* (2009.01)
*H04W 88/08* (2009.01)
*H04W 84/12* (2009.01)

(52) U.S. Cl.
CPC .......... *H04W 74/006* (2013.01); *H04W 84/12* (2013.01); *H04W 88/08* (2013.01)

(56) References Cited

U.S. PATENT DOCUMENTS

| | | |
|---|---|---|
| 2012/0163349 A1 | 6/2012 | Fontaine et al. |
| 2012/0315944 A1 | 12/2012 | Jeon et al. |
| 2013/0077554 A1 | 3/2013 | Gauvreau et al. |
| 2014/0064257 A1 | 3/2014 | Fontaine et al. |
| 2015/0215057 A1 | 7/2015 | Knowles |
| 2015/0271748 A1* | 9/2015 | Seok ............... H04W 48/20 370/338 |
| 2017/0325158 A1 | 11/2017 | Phogat et al. |
| 2017/0332286 A1* | 11/2017 | Lepp ............... H04W 52/0212 |
| 2018/0270684 A1 | 9/2018 | Knowles |
| 2021/0058981 A1 | 2/2021 | Asterjadhi et al. |
| 2021/0153125 A1* | 5/2021 | Cariou ............. H04W 52/0235 |
| 2021/0168795 A1* | 6/2021 | Yang ............... H04L 5/0048 |

OTHER PUBLICATIONS

Chu (STMICROELECTRONICS) L., "Fair Quiet for DFS, 11-11-1388-00-00ac-Fair-Quiet-for-DFS", IEEE SA Mentor, 11-11-1388-00-00AC-FAIR-QUIET-FOR-DFS, IEEE-SA Mentor, Piscataway, NJ, USA, vol. 802.11ac, Oct. 18, 2011 (Oct. 18, 2011), pp. 1-6, XP068037613, p. 3-p. 4.

International Preliminary Report on Patentability—PCT/US2020/046853 The International Bureau of WIPO—Geneva, Switzerland, dated Mar. 3, 2022.

International Search Report and Written Opinion—PCT/US2020/046853—ISAEPO—dated Dec. 14, 2020.

Wang (MEXIATEK) C-C., et al., "The Co-Existence of 11ax Network and Ad Hoc/STA-2-STA Network", Setting-Quiet-Time-Period, 11-16-1237-01-00ax-Setting-Quiet-Time-Period, IEEE Draft, 11-16-1237-01-00AX-Setting-Quiet-Time- Period, IEEE-SA Mentor, Piscataway, NJ, USA, vol. 802.11ax, No. 1, Sep. 15, 2016 (Sep. 15, 2016), pp. 1-18, XP068107685, Sep. 12, 2016, p. 13-p. 16.

* cited by examiner

SYNCHRONIZED CHANNEL ACCESS COEXISTENCE

PRIORITY INFORMATION

The present application for patent is a Continuation of U.S. patent application Ser. No. 16/991,943, entitled "SYNCHRONIZED CHANNEL ACCESS COEXISTENCE," filed 12 Aug. 2020, which claims priority under 35 U.S.C. § 119 to U.S. Provisional Patent Application No. 62/889,919, entitled "SYNCHRONIZED CHANNEL ACCESS COEXISTENCE," filed 21 Aug. 2019, both of which are assigned to the assignee hereof and hereby expressly incorporated by reference herein.

TECHNICAL FIELD

This disclosure relates generally to wireless communication, and more specifically, to techniques for facilitating coexistence with wireless communication devices that support synchronized channel access.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In typical WLAN deployments, wireless communication devices may contend for access to a wireless channel at will according to particular rules. Generally, before a wireless communication device, such as an AP or a STA, is permitted to transmit data, it must perform a clear channel assessment (CCA) and determine that the desired wireless channel is idle. For example, physical carrier sensing may involve the measurement of a received signal strength of an interfering frame, which is then compared to a threshold to determine whether the channel is busy. If the channel remains idle, the wireless communication device initiates a backoff timer, which represents a duration of time that the device must sense the medium to be idle before it is permitted to transmit. If the channel remains idle until the backoff timer expires, the wireless communication device becomes the holder of a transmit opportunity (TXOP) and may begin transmitting.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a wireless communication device of a first access point (AP). The method includes exchanging a wireless packet with at least a first set of wireless communication devices. The wireless packet includes one or more quiet elements, each quiet element indicating to a second set of wireless communication devices that they are not permitted to transmit on a wireless channel during a quiet period defined by the quiet element. The wireless packet additionally includes a quiet override element indicating to the first set of wireless communication devices, for each of one or more of the quiet elements, whether they are permitted to contend for access to the wireless channel during a contention period of the quiet period defined by the respective quiet element. The method further includes contending for access to the wireless channel during one or more of the contention periods indicated by the respective quiet elements and the quiet override element.

Another innovative aspect of the subject matter described in this disclosure can be implemented in a wireless communication device of a first AP. The wireless communication device includes at least one modem, at least one processor communicatively coupled with the at least one modem, and at least one memory communicatively coupled with the at least one processor and storing processor-readable code. The code, when executed by the at least one processor in conjunction with the at least one modem, is configured to cause the wireless communication device to exchange a wireless packet with at least a first set of wireless communication devices. The wireless packet includes one or more quiet elements, each quiet element indicating to a second set of wireless communication devices that they are not permitted to transmit on a wireless channel during a quiet period defined by the quiet element. The wireless packet additionally includes a quiet override element indicating to the first set of wireless communication devices, for each of one or more of the quiet elements, whether they are permitted to contend for access to the wireless channel during a contention period of the quiet period defined by the respective quiet element. The code, when executed by the at least one processor in conjunction with the at least one modem, is further configured to cause the wireless communication device to contend for access to the wireless channel during one or more of the contention periods indicated by the respective quiet elements and the quiet override element.

In some implementations of the method and wireless communication device described above, the quiet override elements are not interpretable by the second set of wireless communication devices. In some implementations of the method and wireless communication device described above, the first set of wireless communication devices are not permitted to contend for access to the wireless channel for a remainder of each of the quiet periods after the respective contention periods.

In some implementations of the method and wireless communication device described above, each quiet element includes a field indicating a periodicity of the respective quiet period, a field indicating a duration of the respective quiet period, and a field indicating a start of the respective quiet period. In some implementations of the method and wireless communication device described above, the quiet override element includes a bitmap including a plurality of bits, each bit of the plurality of bits being associated with a respective one of the quiet elements and indicating whether the first set of wireless communication devices is permitted to contend for access to the wireless channel during a contention period of the quiet period defined by the respective quiet element. In some implementations of the method and wireless communication device described above, the quiet override element indicates a duration of each of the contention periods.

In some implementations of the method and wireless communication device described above, the exchange of the wireless packet includes transmitting or receiving a management frame that includes the one or more quiet elements and the quiet override element. For example, the management frame may be a beacon frame. In some implementations of the method and wireless communication device described above, the first AP may transmit an operation element indicating that the first AP supports the use of quiet override elements. In some implementations of the method and wireless communication device described above, the first AP may receive a capability element from a wireless communication device of the first set of wireless communication devices indicating that the wireless communication device supports the use of quiet override elements.

In some implementations of the method and wireless communication device described above, the first set of wireless communication devices includes one or more other APs, and the first AP is configured to synchronize a clock with a clock of each AP of the one or more other APs. In some implementations of the method and wireless communication device described above, the first set of wireless communication devices does not include any stations.

In some implementations of the method and wireless communication device described above, the first AP obtains a transmission opportunity (TXOP) on the wireless channel during a respective quiet period based on winning the contention in a respective one of the contention periods. The first AP may then exchange one or more wireless data packets on the wireless channel during the TXOP.

Another innovative aspect of the subject matter described in this disclosure can be implemented in a method for wireless communication by a wireless communication device of a first access point (AP). The method includes exchanging a wireless packet with at least a first set of wireless communication devices that includes the first AP. The wireless packet including channel access information indicating a recurring channel access period for a wireless channel, each channel access period including a contention period during which the first set of wireless communication devices is scheduled to contend for access to the wireless channel. The method also includes contending for access to the wireless channel during a plurality of the contention periods associated with a plurality of the respective channel access periods. The method also includes determining a numerical quantity of consecutive channel access periods of the plurality of channel access periods during which no wireless communication devices of the first set of wireless communication devices won the contention. The method additionally includes obtaining a transmission opportunity (TXOP) on the wireless channel during another channel access period of the plurality of channel access periods based on winning the contention in the respective contention period, a length of the TXOP being based on the numerical quantity. The method further includes exchanging one or more wireless packets on the wireless channel during the TXOP.

Another innovative aspect of the subject matter described in this disclosure can be implemented in a wireless communication device of a first AP. The wireless communication device includes at least one modem, at least one processor communicatively coupled with the at least one modem, and at least one memory communicatively coupled with the at least one processor and storing processor-readable code. The code, when executed by the at least one processor in conjunction with the at least one modem, is configured to cause the wireless communication device to exchange a wireless packet with at least a first set of wireless communication devices that includes the first AP. The wireless packet including channel access information indicating a recurring channel access period for a wireless channel, each channel access period including a contention period during which the first set of wireless communication devices is scheduled to contend for access to the wireless channel. The code, when executed by the at least one processor in conjunction with the at least one modem, also is configured to cause the wireless communication device to contend for access to the wireless channel during a plurality of the contention periods associated with a plurality of the respective channel access periods. The code, when executed by the at least one processor in conjunction with the at least one modem, also is configured to cause the wireless communication device to determining a numerical quantity of consecutive channel access periods of the plurality of channel access periods during which no wireless communication devices of the first set of wireless communication devices won the contention. The code, when executed by the at least one processor in conjunction with the at least one modem, is additionally configured to cause the wireless communication device to obtaining a transmission opportunity (TXOP) on the wireless channel during another channel access period of the plurality of channel access periods based on winning the contention in the respective contention period, a length of the TXOP being based on the numerical quantity. The code, when executed by the at least one processor in conjunction with the at least one modem, is further configured to cause the wireless communication device to exchanging one or more wireless packets on the wireless channel during the TXOP.

In some implementations of the method and wireless communication device described above, the first set of wireless communication devices are not permitted to contend for access to the wireless channel for a remainder of each of the channel access periods after the respective contention periods.

In some implementations of the method and wireless communication device described above, the exchange of the wireless packet includes transmitting or receiving a management frame that includes the channel access information. For example, the management frame may be a beacon frame. In some implementations of the method and wireless communication device described above, the channel access information indicates a periodicity of the recurring channel access period, a duration of the recurring channel access period, a start of a next channel access period, and a duration of the contention period.

In some implementations of the method and wireless communication device described above, the first AP may transmit an operation element indicating that the first AP supports the use of channel access periods. In some implementations of the method and wireless communication device described above, the first AP may receive a capability element from a wireless communication device of the first set of wireless communication devices indicating that the wireless communication device supports the use of channel access periods.

In some implementations of the method and wireless communication device described above, the first set of wireless communication devices includes one or more other APs, and the first AP is configured to synchronize a clock with a clock of each AP of the one or more other APs. In some implementations of the method and wireless communication device described above, the first set of wireless communication devices does not include any stations.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
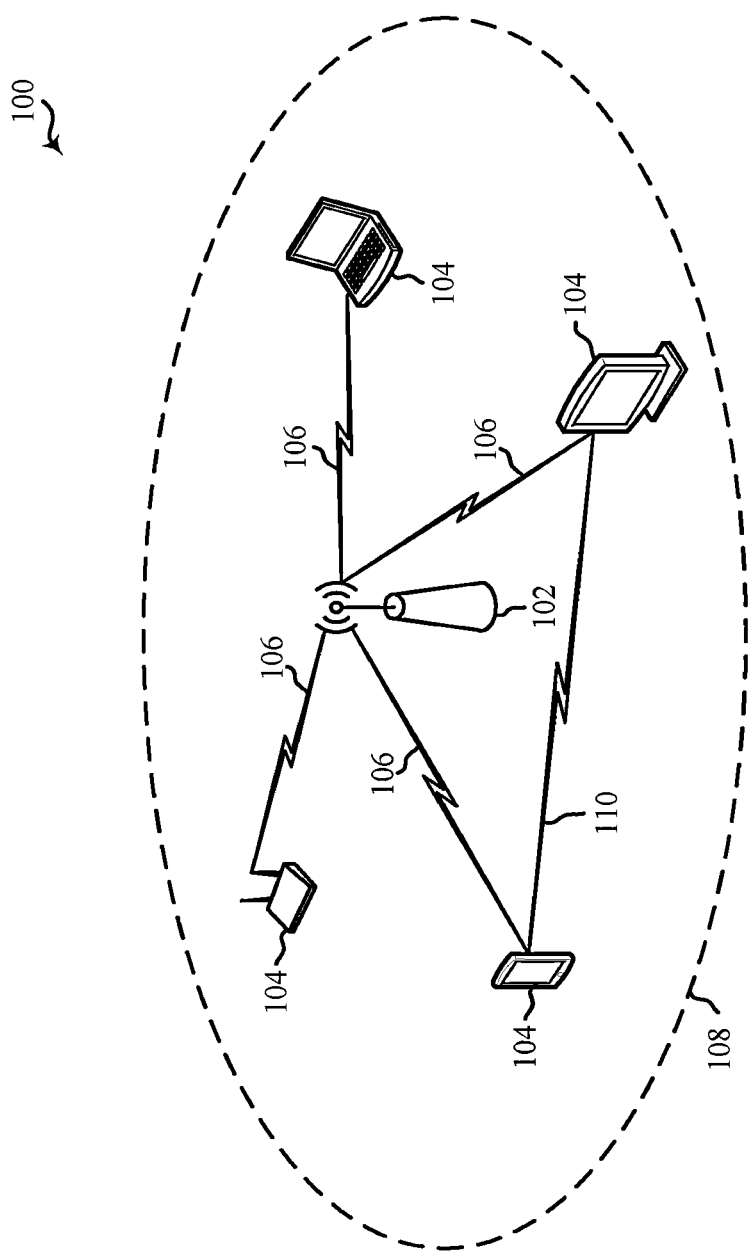
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to synchronized channel access techniques. Some implementations more specifically relate to techniques for facilitating coexistence among wireless communication devices that support synchronized channel access and wireless communication devices that do not support synchronized channel access. Each synchronized channel access period may include a scheduled contention period, during which multiple synchronized APs contend for access, followed by a communication period during which the successful AP holds a TXOP. In some implementations, synchronized APs may schedule periodically recurring, synchronized channel access periods by periodically transmitting quiet elements. The quiet elements establish recurring quiet periods during which legacy devices are not permitted to transmit. For example, one or more synchronized APs may transmit management frames (for example, beacon frames or probe response frames) that include one or more quiet elements specifying respective quiet periods. In some implementations, the management frames containing the quiet elements may further include one or more quiet override elements each associated with a respective one of the quiet elements. A quiet override element indicates to the synchronized APs that the quiet period established by the respective quiet element is to be used for synchronized channel access, and as such, that the synchronized APs are permitted to contend for access during the respective contention period.

In some implementations of synchronized channel access described herein, a synchronized AP that wins contention after one or more consecutive contention periods during which no synchronized APs won contention, may be entitled to an extended TXOP. In some such implementations, the length of the extended TXOP may be based on the number (the numerical quantity) of consecutive contention periods during which no synchronized APs won contention. For example, the length of the extended TXOP may be an integer multiple of the normal maximum duration of a TXOP, for example, where the value of the integer is equal to the number of determined consecutive contention periods that were missed (that is, contention periods during which no synchronized APs won contention).

Particular implementations of the subject matter described in this disclosure can be implemented to realize one or more of the following potential advantages. In some implementations, the described techniques can be used to facilitate coexistence among wireless communication devices that are configured for synchronized channel access and wireless communication devices that are not configured for synchronized channel access. Some implementations ensure that wireless communication devices supporting synchronized channel access are provided with enough access to a wireless medium to, for example, satisfy their throughput and latency requirements. For example, some implementations enable efficient use of the wireless medium by reserving wireless channels during synchronized channel access periods for use by APs to transmit downlink communications to associated STAs and to schedule uplink communication transmissions from the associated STAs. As another example, some implementations enable efficient use of wireless channels by granting wireless communication devices configured for synchronized channel access extended durations of time for communicating with associated stations (STAs).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B16 within range of the STA or to select among multiple APs 102 that together form an extended service set (ESS) including multiple connected B16. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
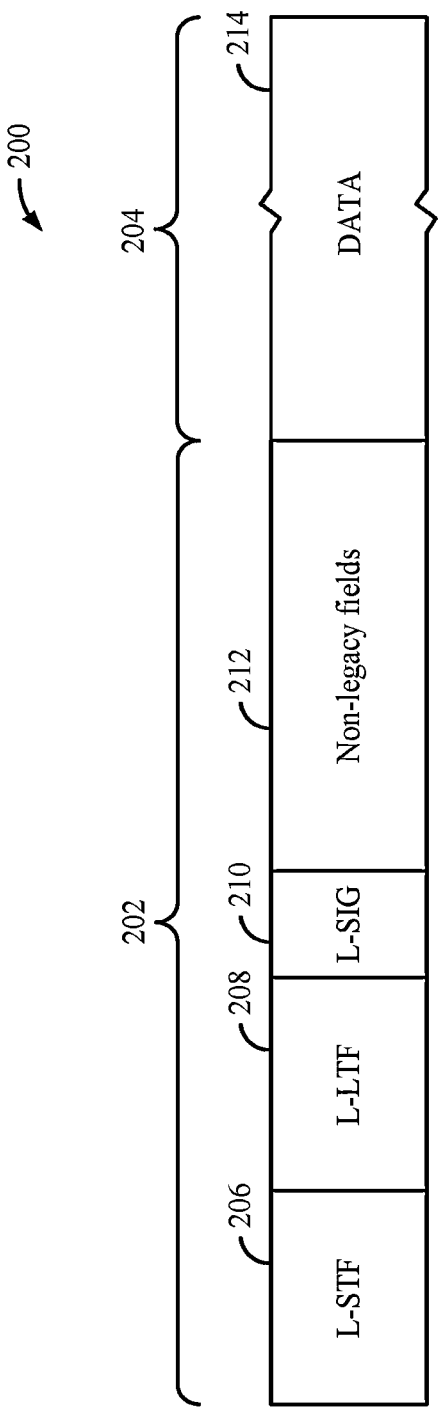
FIG. 2A shows an example protocol data unit (PDU) usable for communications between an access point (AP) and a number of stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
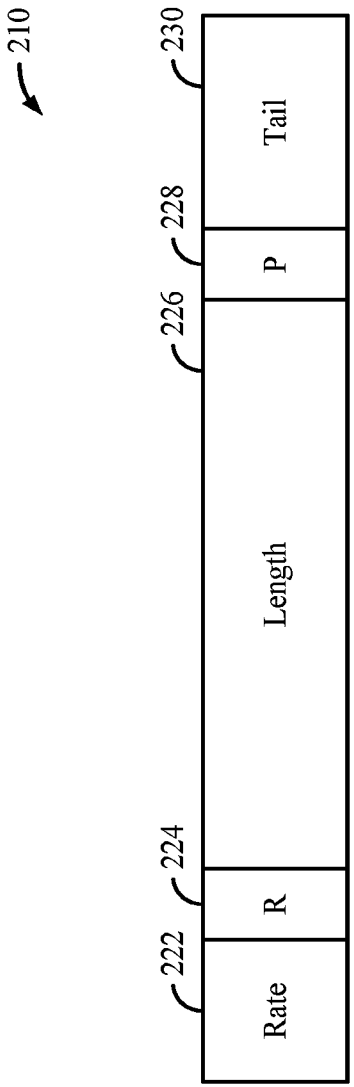
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
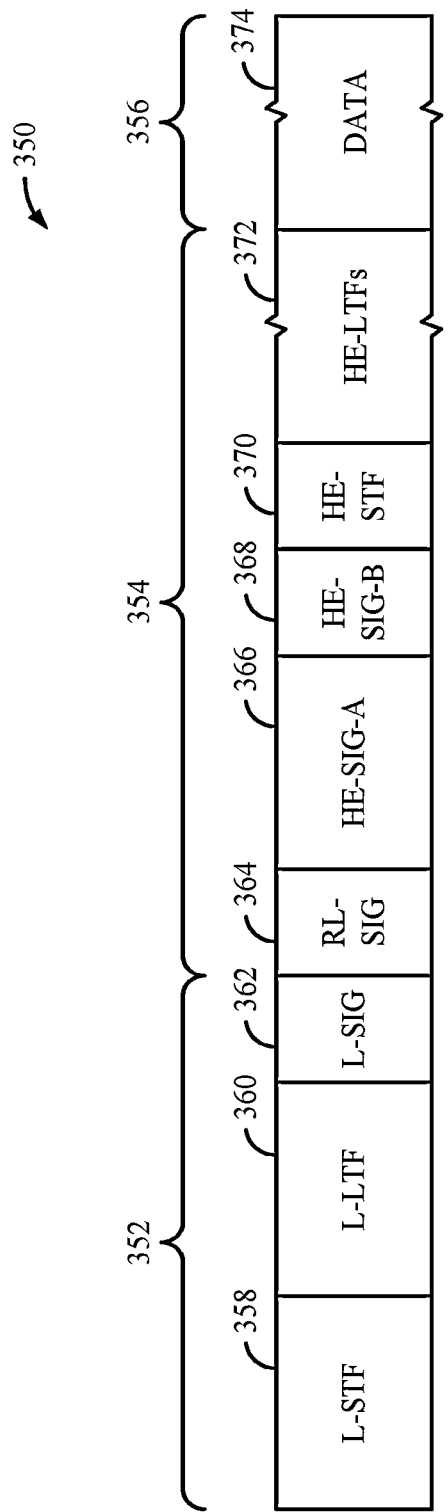
FIG. 3 shows another example PDU usable for communications between an AP and a number of STAs.

FIG. 3 shows another example PDU 350 usable for wireless communication between an AP and a number of STAs. The PDU 350 may be used for MU-OFDMA or MU-MIMO transmissions. The PDU 350 includes a PHY preamble including a legacy portion 352 and a non-legacy portion 354. The PDU 350 may further include a PHY payload 356 after the preamble, for example, in the form of a PSDU including a DATA field 374. The legacy portion 352 includes L-STF 358, L-LTF 360, and L-SIG 362. The non-legacy portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The non-legacy portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like the L-STF 358, L-LTF 360, and L-SIG 362, the information in RL-SIG 364 and HE-SIG-A 366 may be duplicated and transmitted in each of the component 20 MHz channels in instances involving the use of a bonded channel. In contrast, HE-SIG-B 368 may be unique to each 20 MHz channel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
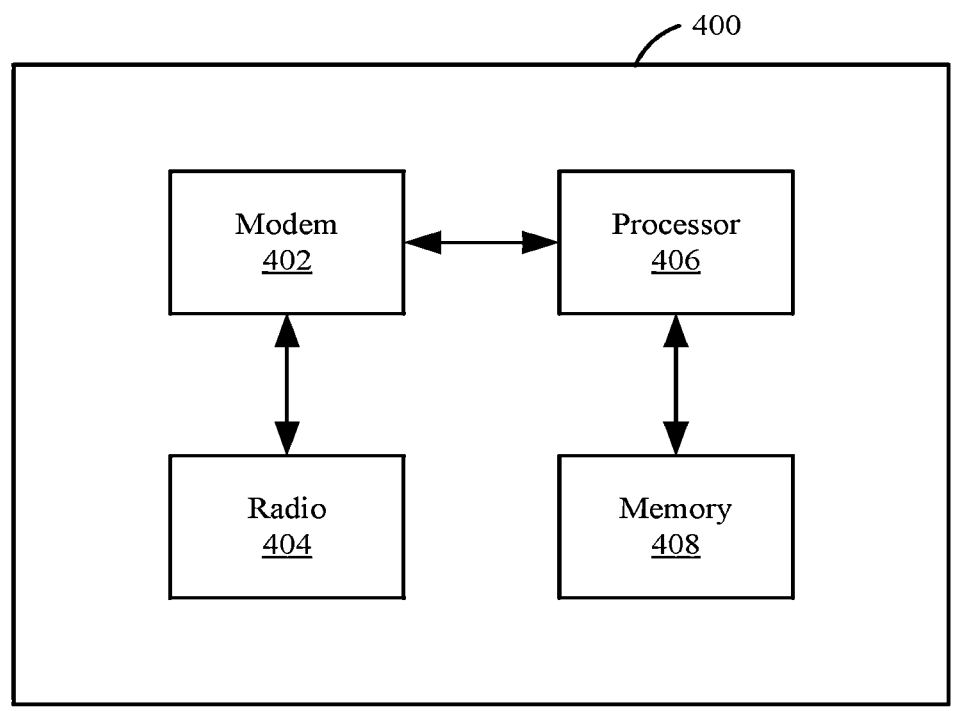
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
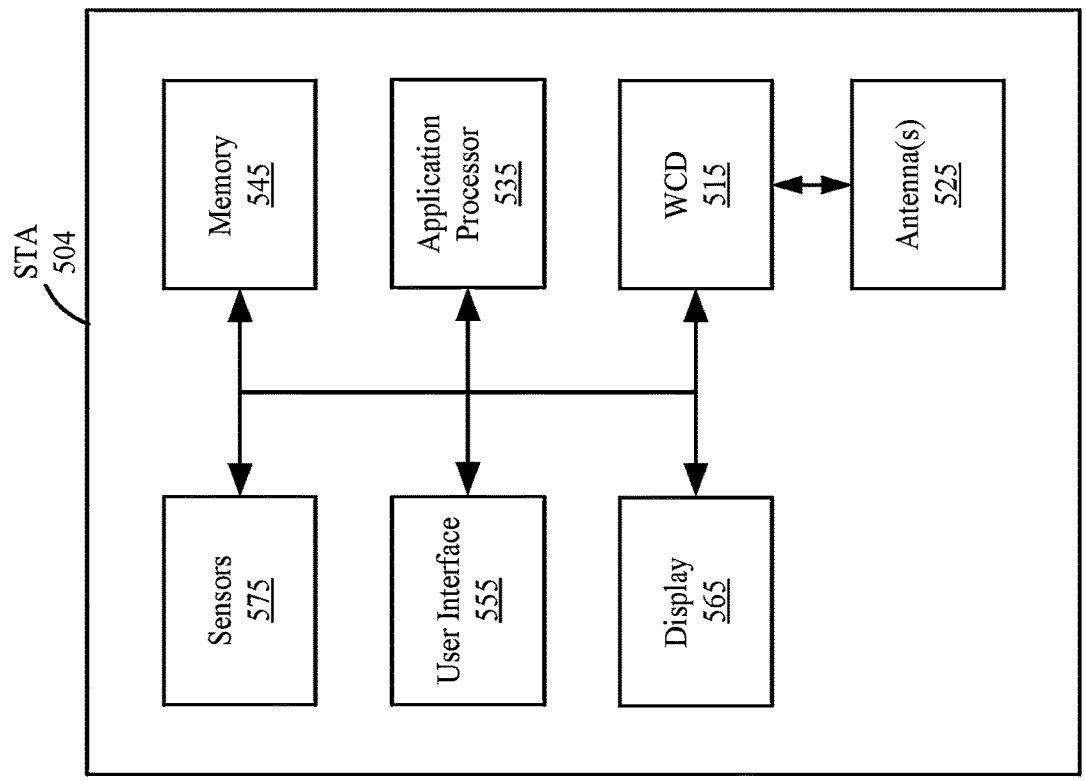
FIG. 5B shows a block diagram of an example station (STA).
Figure 5A:
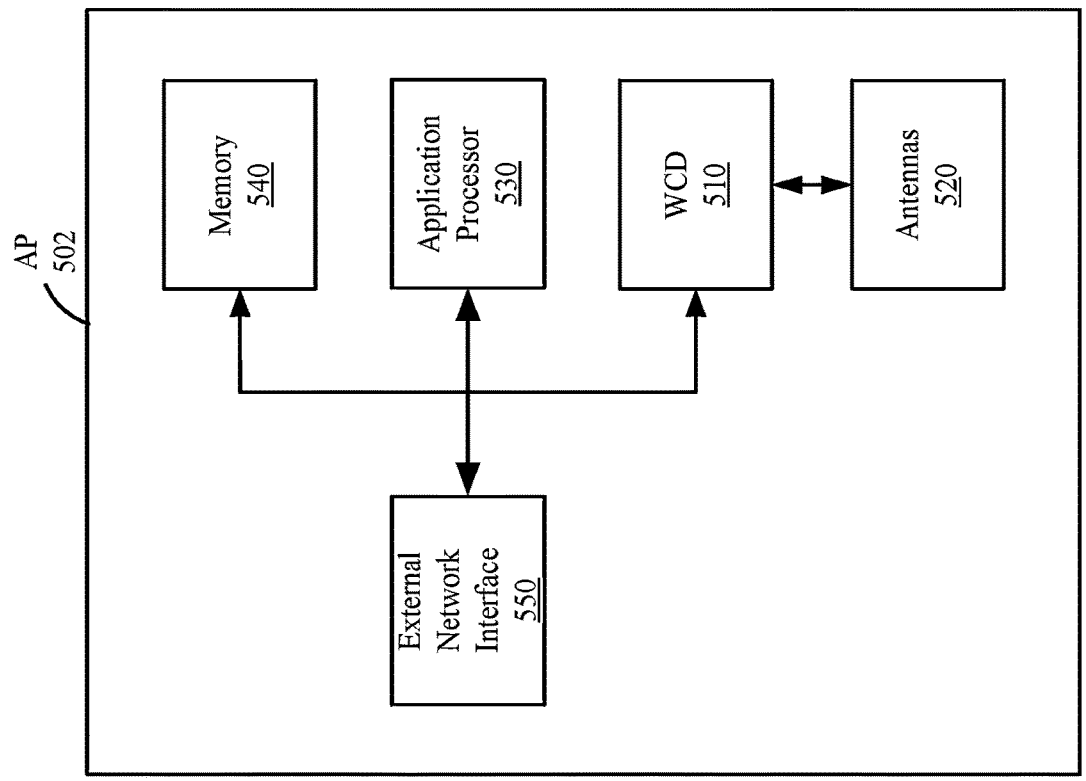
FIG. 5A shows a block diagram of an example access point (AP).

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 4000 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Access to the shared wireless medium is generally governed by a Distributed Coordination Function (DCF). With a DCF, there is no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device must perform a Clear Channel Assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a properly decoded preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected preamble or even if the detected energy is below the relevant threshold.

When the NAV reaches 0, the wireless communication device performs the physical carrier sensing. If the channel remains idle for the appropriate interframe space (IFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or owner) of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Recent wireless communication protocols, including IEEE 802.11be, may support scheduled access techniques in addition to, or as an alternative to, conventional DCF techniques, enabling multiple APs and STAs to share and communicate over a wireless medium. For example, multiple APs may be configured to support synchronized channel access techniques (such APs are hereinafter also referred to as "synchronized APs") including the use of recurring channel access periods (hereinafter also referred to as "synchronized channel access periods") during which the multiple synchronized APs are scheduled to contend for access to one or more wireless channels of a shared frequency band.

Figure 6A:
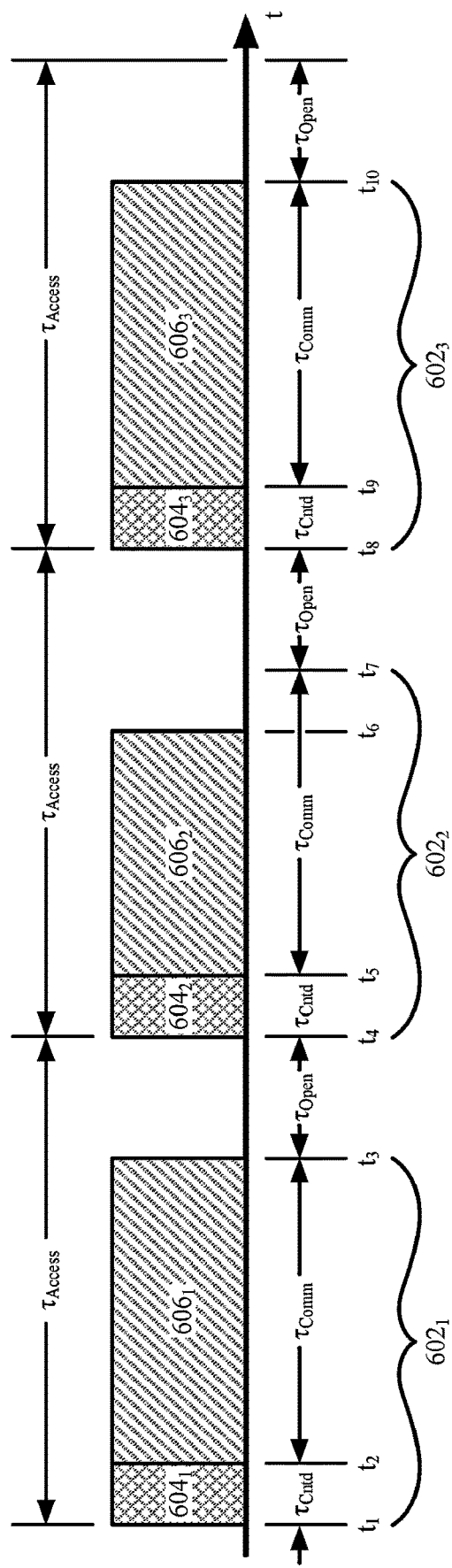
FIG. 6A shows example synchronized channel access periods.

FIG. 6A shows example synchronized channel access periods 602 (for example, including a first channel access period $602_1$, a second channel access period $602_2$ and a third channel access period $602_3$). The channel access periods 602 recur according to a time interval $\tau_{Access}$. Each channel access period 602 includes a respective contention period 604 (for example, contention periods $604_1$, $604_2$ and $604_3$) at the start of the channel access period and having a duration $\tau_{Cntd}$. Each channel access period 602 may also include a respective communication period having a duration $\tau_{Comm}$. Only during the contention periods 604, at the start of the scheduled channel access periods 602, do APs enabled for synchronized channel access and desiring to communicate over the wireless channel contend for access. Additionally, STAs that support synchronized channel access may also understand channel access information and remain silent during the channel access periods 602 unless triggered by their associated APs.

The winner of the contention during a contention period 604 becomes the owner of a TXOP 606 (for example, one of TXOPs $606_1$, $606_2$ and $606_3$) that may extend from a start of the respective communication period to an end of the communication period. However, the owner of the TXOP may not need the entire communication period. For example, in the second channel access period $602_2$, the TXOP $606_2$ does not extend to the end of the respective communication period. In some implementations, the synchronized APs are not permitted to contend for access to the wireless channel for a remainder of the respective channel access period after the contention period even if the TXOP owner has finished transmitting and receiving. However, in some implementations, between adjacent channel access periods 602, there may be periods of time (hereinafter also referred to as "open periods") having duration $\tau_{Open}$ during which the wireless medium is open for regular contention-based access as governed by, for example, the CSMA/CA techniques describe above.

Figure 6B:
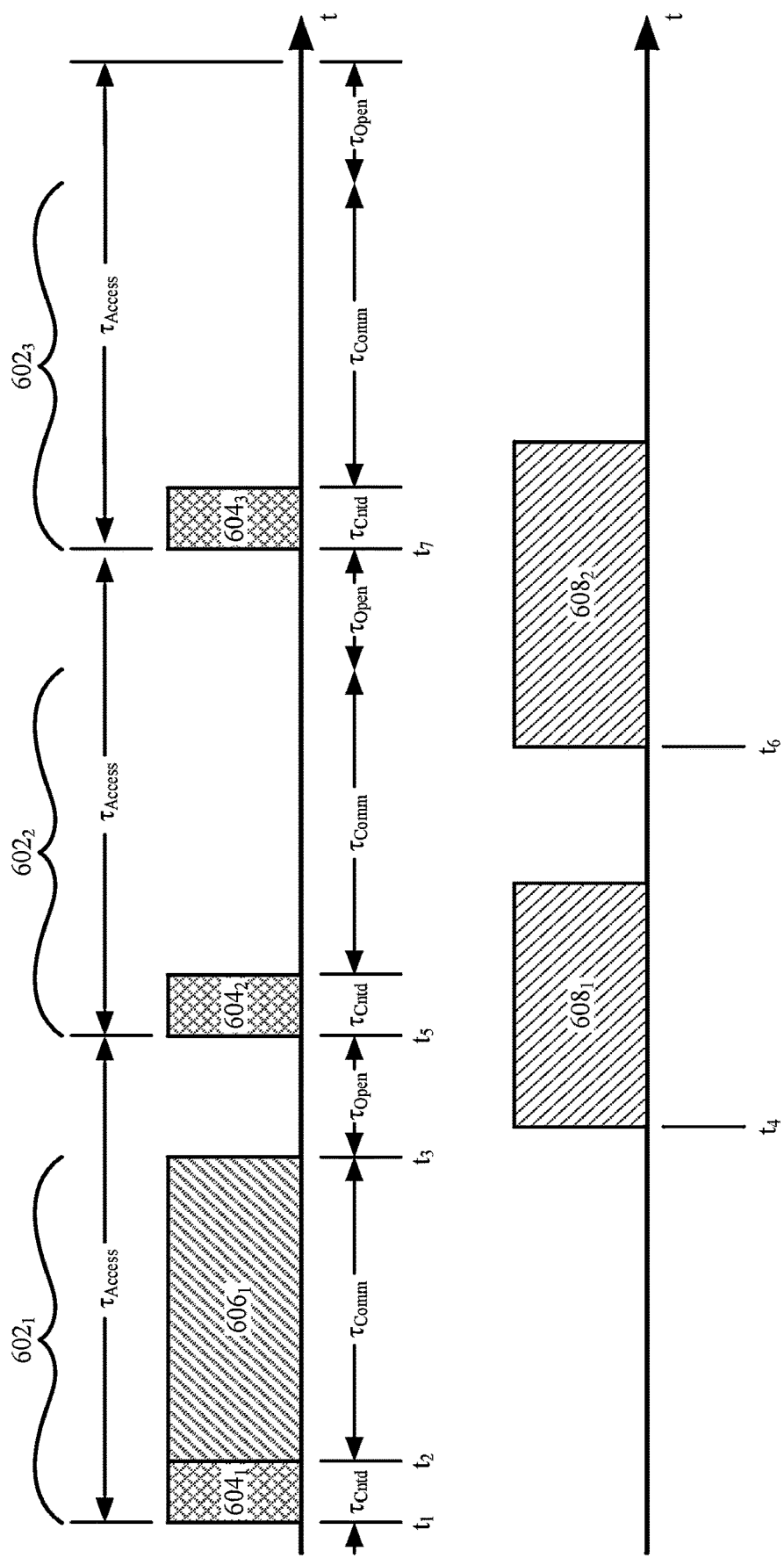
FIG. 6B shows example synchronized channel access periods during which there are interfering transmissions from other wireless communication devices.

FIG. 6B shows example synchronized channel access periods 602 during which there are interfering transmissions from other wireless communication devices. For example, multiple synchronized APs may contend for access during a first contention period $604_1$ of a first channel access period $602_1$ beginning at time $t_1$. One of the synchronized APs wins the contention and obtains a first TXOP $606_1$ that begins at time $t_2$ and that extends through time $t_3$. During the first TXOP $606_1$, the AP may transmit DL communications to one or multiple STAs or trigger the transmissions of, and receive, UL communications from one or multiple STAs.

At a time $t_4$, during the open period between the end of the first TXOP $606_1$ of the first channel access period $602_1$ and the start of the contention period $604_2$ of the second channel access period $602_2$, another wireless communication device (for example, an AP or a STA that is not configured for synchronized channel access) contends for access to the wireless medium and obtains a TXOP $608_1$ that extends through the second contention period $604_2$. As such, when the synchronized APs contend for access during the second contention period $604_2$ beginning at time $t_5$, they will detect that the wireless channel is busy (or "not idle" or "not free") and none of them will obtain a TXOP during the subsequent communication period of the second channel access period $602_2$. Similarly, at time $t_6$, during the communication period in the second channel access period $602_2$ that should have been used for a TXOP by one of the synchronized APs, another wireless communication device (for example, an AP or a STA that is not configured for synchronized channel access) contends for access to the wireless medium and obtains a TXOP $608_2$ that extends through the third contention period $604_3$. As such, when the synchronized APs contend for access during the third contention period $604_3$ beginning at time $t_7$, they will detect that the wireless channel is not idle and none of them will obtain a TXOP during the subsequent communication period of the third channel access period $602_3$. In this way, synchronized APs and their associated STAs may be starved for access to the shared wireless medium by other APs or STAs not configured for synchronized channel access.

Some wireless communication protocols, including those supporting IEEE 802.11 standards, support the use of quiet periods. Each quiet period refers to a duration of time during which no wireless communication devices, including APs and STAs, are generally permitted to access an indicated wireless channel or channels of the shared frequency band. One initial motivation for the support of quiet periods was to permit an AP to perform measurements without interference, for example, measurements for dynamic frequency selection (DFS) purposes. In some implementations, quiet periods may be recurring, for example, based on a given beacon interval. Additionally, more than one quiet period may be defined for each beacon interval.

Figure 7:
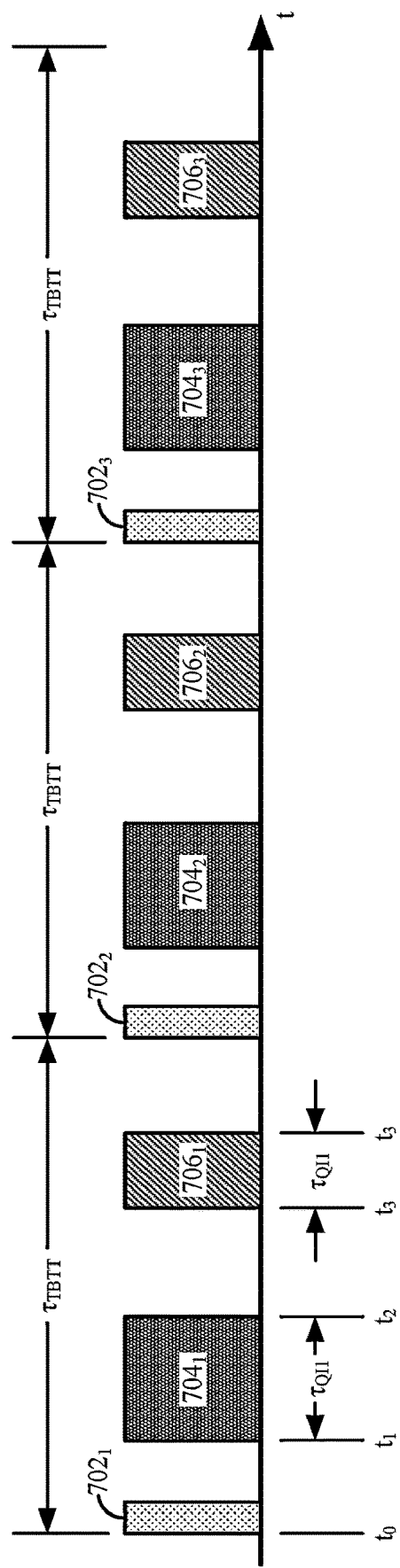
FIG. 7 shows example recurring quiet periods.

FIG. 7 shows example recurring quiet periods 704 and 706. In the illustrated example, the recurring quiet periods 704 and 706 (also referred to herein as "quiet intervals" or "quiet times") recur according to a target beacon transmission time (TBTT) having a time interval $\tau_{TBTT}$. In the example of FIG. 7, a first set of recurring quiet periods 704 (including quiet periods $704_1$, $704_2$ and $704_3$) each have a duration $\tau_{QP1}$, and a second set of recurring quiet periods 706 (including quiet periods $706_1$, $706_2$ and $706_3$) each have a duration $\tau_{QP2}$. The quiet periods may be signaled in beacons, probe responses, or other management frames, for example, by an AP in a BSS or a STA in a mesh BSS (MBSS). For example, the first and the second sets of quiet periods 704 and 706 may be signaled in beacons 702 (including beacons $702_1$, $702_2$ and $702_3$) transmitted at the TBTT.

Figure 8:
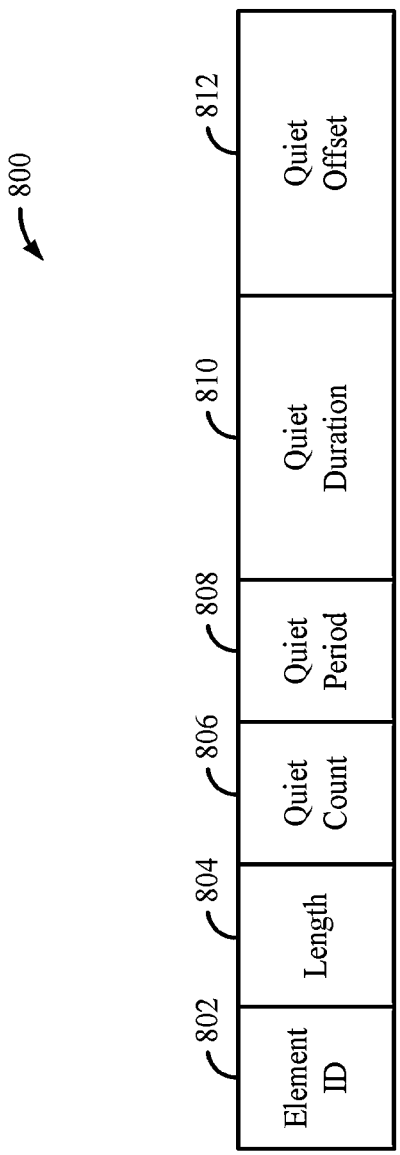
FIG. 8 shows an example quiet element that may be used to signal a respective quiet period.

FIG. 8 shows an example quiet element 800 that may be used to signal a respective quiet period. The quiet element 800 may be transmitted to signal a quiet period in one indicated wireless channel or in multiple (or even all) wireless channels of the shared frequency band. As described above, an AP or STA may include quiet elements, such as the quiet element 800, in management frames including beacon frames and probe response frames. In the example shown, the quiet element 800 includes multiple fields including an element identification (ID) 802, a length 804, a quiet count 806, a quiet period 808, a quiet duration 810 and a quiet offset 812. The element ID 802 may be a unique identifier of the quiet element 800. The length 804 may indicate the length of the quiet element 800. The quiet count 806 may indicate the number of TBTTs remaining until the beacon interval during which the next respective quiet period begins. The quiet period 808 may similarly indicate a number of beacon intervals until the next respective quiet period begins. The quiet duration 810 may indicate the duration of the respective quiet period in units of, for example, TUs. The quiet offset 812 may indicate an offset between the start of the respective quiet period from the TBTT indicated by the quiet count 806 in units of, for example, TUs.

Various implementations relate generally to synchronized channel access techniques. Some implementations more specifically relate to techniques for facilitating coexistence among wireless communication devices that support synchronized channel access and wireless communication devices that do not support synchronized channel access. Each synchronized channel access period may include a scheduled contention period, during which multiple synchronized APs contend for access, followed by a communication period during which the successful AP holds a TXOP. In some implementations, synchronized APs may schedule periodically recurring, synchronized channel access periods by periodically transmitting quiet elements. The quiet elements establish recurring quiet periods during which legacy devices are not permitted to transmit. For example, one or more synchronized APs may transmit management frames (for example, beacon frames or probe response frames) that include one or more quiet elements specifying respective quiet periods. In some implementations, the management frames containing the quiet elements may further include one or more quiet override elements each associated with a respective one of the quiet elements. A quiet override element indicates to the synchronized APs that the quiet period established by the respective quiet element is to be used for synchronized channel access, and as such, that the synchronized APs are permitted to contend for access during the respective contention period.

In some implementations of synchronized channel access described herein, a synchronized AP that wins contention after one or more consecutive contention periods during which no synchronized APs won contention, may be entitled to an extended TXOP. In some such implementations, the length of the extended TXOP may be based on the number (the numerical quantity) of consecutive contention periods during which no synchronized APs won contention. For example, the length of the extended TXOP may be an integer multiple of the normal maximum duration of a TXOP, for example, where the value of the integer is equal to the number of determined consecutive contention periods that were missed (that is, contention periods during which no synchronized APs won contention).

Particular implementations of the subject matter described in this disclosure can be implemented to realize one or more of the following potential advantages. In some implementations, the described techniques can be used to facilitate coexistence among wireless communication devices that are configured for synchronized channel access and wireless communication devices that are not configured for synchronized channel access. Some implementations ensure that wireless communication devices supporting synchronized channel access are provided with enough access to a wireless medium to, for example, satisfy their throughput and latency requirements. For example, some implementations enable efficient use of the wireless medium by reserving wireless channels during synchronized channel access periods for use by APs to transmit downlink communications to associated STAs and to schedule uplink communication transmissions from the associated STAs. As another example, some implementations enable efficient use of wireless channels by granting wireless communication devices configured for synchronized channel access extended durations of time for communicating with associated stations (STAs).

Figure 9:
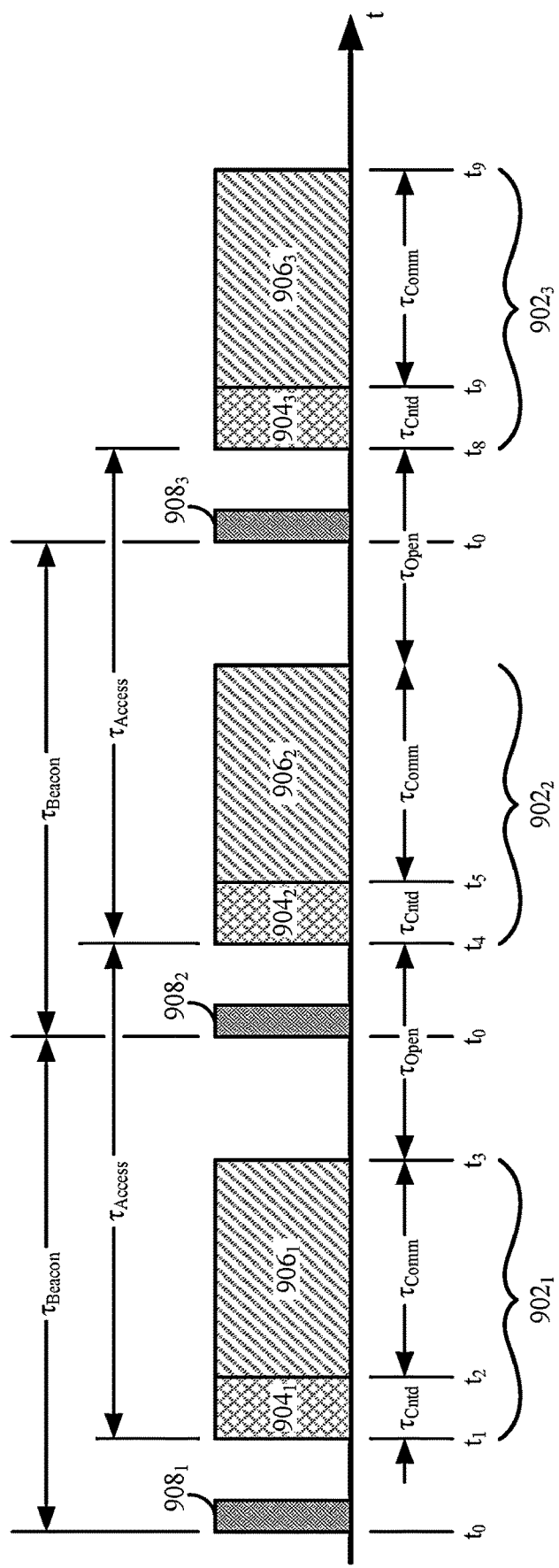
FIG. 9 shows synchronized channel access techniques according to some implementations.

FIG. 9 shows synchronized channel access techniques according to some implementations. For example, FIG. 9 shows synchronized, recurring channel access periods 902 (for example, including a first channel access period $902_1$, a second channel access period $902_2$ and a third channel access period $902_3$). The channel access periods 902 recur according to a periodicity indicated by a time interval $\tau_{Access}$. Each channel access period 902 includes a respective contention period 904 (for example, contention periods $904_1$, $904_2$ and $904_3$) at the start of the channel access period having a duration $\tau_{Cntd}$. Each channel access period 902 may also include a respective communication period 906 (for example, communication periods $906_1$, $906_2$ and $906_3$) having a duration $\tau_{Comm}$. In some implementations, only during the contention periods 904, at the start of the scheduled channel access periods 902, do APs enabled for synchronized channel access, and desiring to communicate over the wireless channel, contend for access. In some implementations, between adjacent channel access periods 902, there may be open periods having duration $\tau_{Open}$ during which the wireless medium is open for regular contention-based access by other wireless communication devices (and optionally also by the synchronized APs) as governed by, for example, the DCF.

Figure 10:
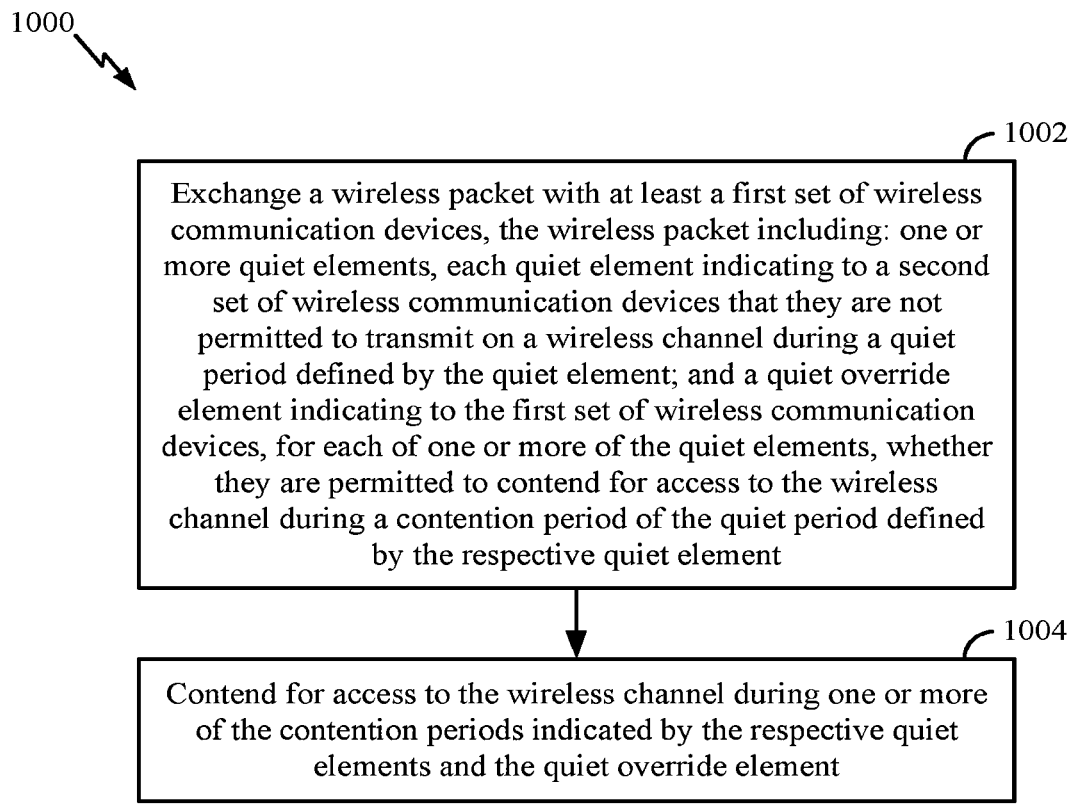
FIG. 10 shows a flowchart illustrating an example process for synchronized channel access according to some implementations.

FIG. 10 shows a flowchart illustrating an example process 1000 for synchronized channel access according to some implementations. The operations of the process 1000 may be implemented by an AP or its components as described herein. For example, the process 1000 may be performed by a wireless communication device such as the wireless communication device 400 described above with reference to FIG. 4. In some implementations, the process 1000 may be performed by an AP, such as one of the APs 102 and 502 described above with reference to FIGS. 1 and 5A, respectively, that is configured for synchronized channel access.

In some implementations, in block 1002, the wireless communication device exchanges a wireless packet with at least a first set of wireless communication devices. The wireless packet includes channel access information establishing one or more recurring synchronized channel access periods. In some implementations, the channel access information is conveyed by one or more quiet elements and one or more quiet override elements included within the wireless packet exchanged in block 1002. Each quiet element indicates to a second set of wireless communication devices that they are not permitted to transmit on a wireless channel during a quiet period defined by the quiet element. In some implementations, a quiet override element indicates to the first set of wireless communication devices, for each of one or more of the quiet elements, whether they are permitted to contend for access to the wireless channel during a contention period of the quiet period defined by the respective quiet element. In this way, the first set of wireless communication devices may schedule periodically recurring, synchronized channel access periods, such as synchronized channel access periods 902 described with reference to FIG. 9, by establishing periodic quiet periods.

If a quiet override element indicates that the first set of wireless communication devices is permitted to contend for access during respective contention periods of each of one or more upcoming quiet periods, then each of the first set of wireless communication devices may, in block 1004, contend for access to the wireless channel during one or more of the contention periods indicated by the respective quiet elements and the quiet override element. If the wireless communication device wins the contention during one of the contention periods 904 in block 1004, it is then the owner of a TXOP on the wireless channel during the respective communication period 906 of the respective channel access period 902. The wireless communication device may then exchange one or more wireless data packets on the wireless channel during the TXOP.

As described above, the quiet elements establish recurring quiet periods during which compatible devices receiving the quiet elements are generally not permitted to transmit. In such a manner, synchronized channel access may be protected. For example, the compatible devices may include the first set of wireless communication devices and the second set of wireless communication devices. The first set of wireless communication devices are APs that support synchronized channel access (synchronized APs). However, while no devices are generally permitted to contend for access during quiet periods, a quiet override element indicates to the first set of wireless communication devices that a quiet period established by a respective quiet element is to be used for synchronized channel access, and as such, that the first set of wireless communication devices is permitted to contend for access during the respective contention period. Additionally, STAs that support synchronized channel access may also understand the quiet override element, and as such, may be configured to receive DL communications from an associated synchronized AP during a quiet period and, in response to receiving a trigger frame from the associated AP, transmit UL communications to the associated AP during the quiet period.

The second set of wireless communication devices may be legacy devices, which may be devices configured to operate according to the IEEE 802.11ax or earlier amendments or versions of the IEEE 802.11 family of standards but not configured to operate according to the IEEE 802.11be or later amendments or versions of the IEEE 802.11 family of standards. The second set of wireless communication devices may also include devices that do not otherwise support, or which have disabled or not implemented, synchronized channel access. The second set of wireless communication devices may be configured to interpret the quiet elements but may not be configured to interpret the quiet override elements.

For example, exchanging the wireless packet including the channel access information in block 1002 may include broadcasting, multicasting, otherwise transmitting, or receiving frames, such as management frames, that include or indicate the quiet elements and quiet override element. For example, referring back to FIG. 9, the channel access information including the quiet elements and quiet override element may be shared in beacons 908 (including beacons $908_1$, $908_2$ and $908_3$) or in probe response frames. For example, the beacon $908_1$ may include a first quiet element and quiet override element that identifies a first quiet period to be used by the first set of wireless communication devices as the channel access period $902_1$.

In some implementations or instances in which the wireless communication device may or may not be (or configured to operate within) a master (or controlling) AP, the wireless communication device may transmit the wireless packet including the channel access information to the other synchronized APs in the first set of wireless communication devices in block 1002. Alternatively, in some other implementations or instances, again, in which the wireless communication device may or may not be (or configured to operate within) a master (or controlling) AP, the wireless communication device may receive the wireless packet including the channel access information from at least one other synchronized AP in block 1002.

The channel access information exchanged in block 1002 may include various channel access parameters associated with the recurring channel access periods 902 such as, for example, one or more of the relevant wireless channel or channels for which the scheduled channel access is defined, a start time of the next channel access period 902, the time interval $\tau_{Access}$ between the starts of consecutive channel access periods 902, the duration $\tau_{Cntd}$ of each contention period 904, the duration $\tau_{Comm}$ of each communication period 906, or the total duration of each channel access period 902. For example, each quiet element may be a quiet element 800 as described with reference to FIG. 8 and include some or all of an element ID, a length, a quiet count, a quiet period, a quiet duration and a quiet offset, including information indicating the duration of the quiet period and the start of the next quiet period. As described above, each of the quiet periods may recur according to a TBTT or other time interval.

Figure 11:
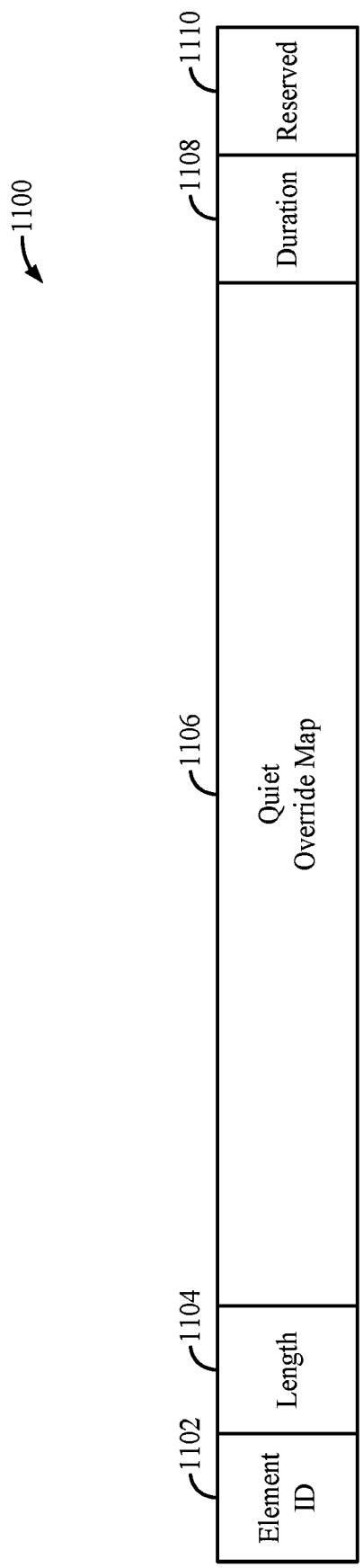
FIG. 11 shows an example quiet override element that may be used to signal an override for a respective quiet period.

As described above, while devices are generally not permitted to contend for access during quiet periods, a quiet override element indicates to the first set of wireless communication devices that a quiet period established by a respective quiet element is to be used for synchronized channel access, and as such, that the first set of wireless communication devices is permitted to contend for access during a respective contention period 904 of a respective synchronized channel access period 902. FIG. 11 shows an example quiet override element 1100 that may be used to signal an override for a respective quiet period. In the example shown, the quiet override element 1100 includes multiple fields including an element ID 1102, a length 1104, and a quiet override map 1106, as well as, in some implementations, a duration field 1108 or a reserved field 1110. The element ID 1102 may be a unique identifier of the quiet override element 1100. The length 1104 may indicate the length of the quiet override element 1100. The quiet override map 1106 may include a bitmap in which each bit is associated with a respective quiet element. A value of each bit in the bitmap 1106 may indicate whether the quiet period defined by a respective quiet element is to be used as a synchronized channel access period 902, and as such, whether the first set of wireless communication devices is permitted to contend for access during a contention period of respective channel access period defined by the quiet element associated with the bit. The duration field 1108 may indicate a duration of each contention period. For example, the duration field 1108 may include a 4-bit value indicating a duration to be used for all contention periods (in some other implementations, the duration field 1108 may include multiple sub-fields each indicating a duration of a respective contention period for a respective quiet period). In some other examples, another field in a beacon or other management frame shared by the synchronized APs may be used to signal the durations of the contention periods.

Figure 12:
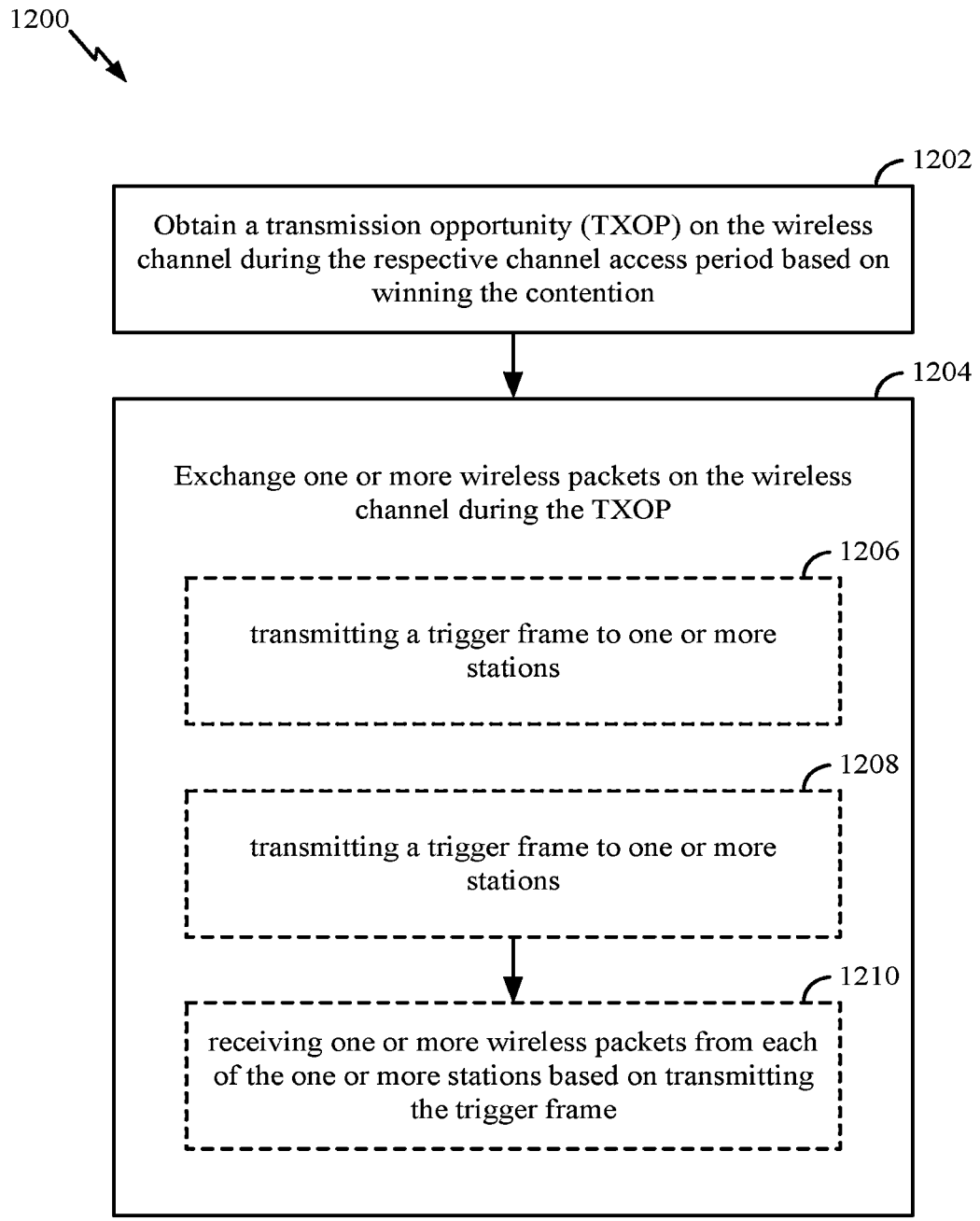
FIG. 12 shows a flowchart illustrating a process for exchanging one or more wireless data packets.

As described above, if the wireless communication device wins the contention during one of the contention periods 904 in block 1004, it is then the owner of a TXOP on the wireless channel during the respective communication period 906 of the respective channel access period 902. The wireless communication device may then exchange one or more wireless data packets on the wireless channel during the TXOP. FIG. 12 shows a flowchart illustrating a process 1200 for exchanging one or more wireless data packets. The operations of the process 1200 may be implemented by an AP or its components as described herein. For example, the process 1200 may be performed by a wireless communication device such as the wireless communication device 400 described above with reference to FIG. 4. In some implementations, the process 1200 may be performed by an AP, such as one of the APs 102 and 502 described above with reference to FIGS. 1 and 5A, respectively, that is configured for synchronized channel access. In some implementations, the process 1200 is performed after contending for access in block 1004 of the process 1000 described with reference to FIG. 10.

In block 1202, the wireless communication device obtains a TXOP based on contending for access in block 1004. In block 1204, the wireless communication device may then exchange one or more wireless data packets on the wireless channel during the TXOP. For example, the wireless communication device may transmit DL data to associated STAs in block 1206. Additionally or alternatively, the wireless communication device may receive UL data from associated STAs. For example, the wireless communication device may, in block 1208, transmit one or more trigger frames to one or more STAs allocating resources to the STAs for UL transmissions, and in response, receive one or more wireless packets from each of the one or more stations including UL data in block 1210.

In some implementations, APs may signal their support for synchronized channel access to other synchronized APs (as well as to STAs) in management frames, such as beacon frames and probe response frames, or other frames transmitted between the synchronized APs. For example, synchronized APs may signal their support for synchronized channel access in an operation element included within the beacon, probe response or other frames. Synchronized APs may also receive management frames, such as probe requests, from STAs indicating that the STAs support synchronized channel access. For example, such STAs may signal their support for synchronized channel access in a capability element included within probe request frames.

In some implementations, the synchronized APs may receive one or more explicit synchronization signals from either a dedicated controller or another AP operating as a master (or controlling) AP. The APs may synchronize their respective clocks based on the synchronization signals to facilitate the implementation of the recurring channel access periods. In some other implementations, the APs may synchronize their clocks based on the receipt of various frames (for example, beacons or other management frames, control frames or data frames) from other APs participating in the recurring channel access periods.

Some implementations of the synchronized channel access techniques described herein may also be used in conjunction with target wake time (TWT) techniques as, for example, defined in IEEE 802.11ax. For example, the wireless communication device may transmit information to one or more associated STAs indicating a schedule of one or more wake periods during which the one or more STAs are to wake to transmit or receive wireless packets to or from the wireless communication device. In such implementations, the one or more wake periods are timed to occur within the channel access periods associated with the quiet periods.

Figure 13:
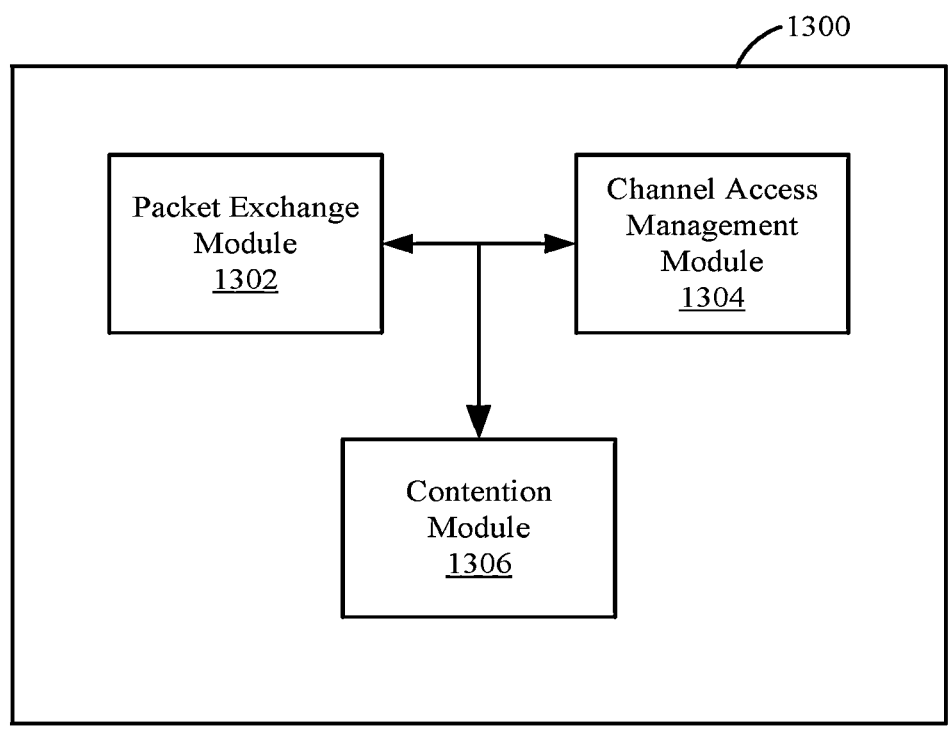
FIG. 13 shows a block diagram of an example wireless communication device according to some implementations.

FIG. 13 shows a block diagram of an example wireless communication device 1300 according to some implementations. In some implementations, the wireless communication device 1300 is configured to perform one or more of the processes 900 and 1200 described above with reference to FIGS. 9 and 12, respectively. The wireless communication device 1300 may be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem). In some implementations, the wireless communication device 1300 can be a device for use in an AP, such as one of the APs 102 and 502 described above with reference to FIGS. 1 and 5A, respectively. In some other implementations, the wireless communication device 1300 can be an AP that includes such a chip, SoC, chipset, package or device as well as at least one transmitter, at least one receiver, and at least one antenna.

The wireless communication device 1300 includes a packet exchange module 1302, a channel access management module 1304 and a contention module 1306. Portions of one or more of the modules 1302, 1304 and 1306 may be implemented at least in part in hardware or firmware. For example, the packet exchange module 1302 may be implemented at least in part by a modem (such as the modem 402). In some implementations, at least some of the modules 1302, 1304 and 1306 are implemented at least in part as software stored in a memory (such as the memory 408). For example, portions of one or more of the modules 1302, 1304 and 1306 can be implemented as non-transitory instructions (or "code") executable by a processor (such as the processor 406) to perform the functions or operations of the respective module.

The packet exchange module 1302 is configured to generate, transmit and receive PDUs including multi-user PDUs and single-user PDUs. For example, the packet exchange module 1302 can by implemented by a PHY layer and a MAC layer. The packet exchange module 1302 is generally configured to generate MPDUs and encode the MPDUs into code blocks. The code blocks may then be encoded into codewords. The packet exchange module 1302 may then map the codewords to symbols and modulate the symbols onto multiple subcarriers as a PPDU. Similarly, the packet exchange module 1302 is configured to receive PPDUs, demodulate and reverse-map the symbols to codewords, decode the codewords, and decode the MPDUs based on the decoded codewords.

The packet exchange module 1302 is configured to exchange wireless packets with at least a first set of wireless communication devices. For example, the packet exchange module 1302 can be configured to perform block 1002 of the process 1000 described with reference to FIG. 10. The packet exchange module 1302 may exchange a wireless packet that includes channel access information establishing one or more recurring synchronized channel access periods. In some implementations, the channel access information is conveyed by one or more quiet elements and one or more quiet override elements included within the wireless packet. For example, each quiet element and quiet override element may be an example of the quiet element 800 or the quiet override element 1100, respectively, described with reference to FIGS. 8 and 11. Each quiet element indicates to a second set of wireless communication devices that they are not permitted to transmit on a wireless channel during a quiet period defined by the quiet element. In some implementations, a quiet override element indicates to the first set of wireless communication devices, for each of one or more of the quiet elements, whether they are permitted to contend for access to the wireless channel during a contention period of the quiet period defined by the respective quiet element. In this way, the first set of wireless communication devices may schedule periodically recurring, synchronized channel access periods by establishing periodic quiet periods.

The first set of wireless communication devices are APs that support synchronized channel access (synchronized APs). While no devices are generally permitted to contend for access during quiet periods, a quiet override element indicates to the first set of wireless communication devices that a quiet period established by a respective quiet element is to be used for synchronized channel access, and as such, that the first set of wireless communication devices is permitted to contend for access during the respective contention period.

The second set of wireless communication devices may be legacy devices, which may be devices configured to operate according to the IEEE 802.11ax or earlier amendments or versions of the IEEE 802.11 family of standards but not configured to operate according to the IEEE 802.11be or later amendments or versions of the IEEE 802.11 family of standards. The second set of wireless communication devices may also include devices that do not otherwise support, or which have disabled or not implemented, synchronized channel access. The second set of wireless communication devices may be configured to interpret the quiet elements but may not be configured to interpret the quiet override elements.

Exchanging the wireless packet including the channel access information may include broadcasting, multicasting, otherwise transmitting, or receiving frames, such as management frames, that include or indicate the quiet elements and quiet override element. In some implementations or instances in which the wireless communication device may or may not be (or configured to operate within) a master (or controlling) AP, the packet exchange module 1302 may, when exchanging the wireless packet, transmit the wireless packet including the channel access information to the other synchronized APs in the first set of wireless communication devices. Alternatively, in some other implementations or instances, again, in which the wireless communication device may or may not be (or configured to operate within) a master (or controlling) AP, the packet exchange module 1302 may, when exchanging the wireless packet, receive the wireless packet including the channel access information from at least one other synchronized AP.

The packet exchange module 1302 also can be configured to perform block 1204 of the process 1200 described with reference to FIG. 12. As described above, if the wireless communication device wins the contention during one of the contention periods, it is then the owner of a TXOP on the wireless channel during the respective communication period of the respective channel access period. The packet exchange module 1302 may then exchange one or more wireless data packets on the wireless channel during the TXOP. For example, the packet exchange module 1302 may transmit DL data to associated STAs. Additionally or alternatively, the packet exchange module 1302 may receive UL data from associated STAs. For example, the packet exchange module 1302 may transmit one or more trigger frames to one or more STAs allocating resources to the STAs for UL transmissions, and in response, receive one or more wireless packets from each of the one or more stations including UL data.

The channel access management module 1304 is configured to extract channel access information from the wireless packet including one or more quiet elements and one or more quiet override elements. The channel access information may include various channel access parameters associated with the recurring channel access periods such as, for example, one or more of the relevant wireless channel or channels for which the scheduled channel access is defined, a start time of the next channel access period, the time interval $\tau_{Access}$ between the starts of consecutive channel access periods, the duration $\tau_{Cntd}$ of each contention period, the duration $\tau_{Comm}$ of each communication period, or the total duration of each channel access period. For example, each quiet element may be a quiet element 800 as described with reference to FIG. 8 and include some or all of an element ID, a length, a quiet count, a quiet period, a quiet duration and a quiet offset, including information indicating the duration of the quiet period and the start of the next quiet period. Each quiet override element may be a quiet override element 1100 as described with reference to FIG. 11 and include some or all of an element ID, a length, a quiet override map 1106 and a contention period duration.

In some implementations, the channel access management module 1304 is generally configured to instruct the packet exchange module 1302 when to transmit wireless packets establishing synchronized channel access. The channel access management module 1304 is also configured to identify contention periods in recurring channel access periods and to instruct the contention module 1306 when to contend for access. The channel access management module 1304 may further be configured to instruct the packet exchange module 1302 when to transmit wireless data packets during respective communication periods of the channel access periods.

In some implementations, the channel access management module 1304 is further configured to synchronize a clock with a clock of other APs for facilitating synchronized channel access. For example, the packet exchange module 1302 may receive one or more explicit synchronization signals from either a dedicated controller or another AP operating as a master AP. The channel access management module 1304 may synchronize its clock based on the synchronization signals to facilitate the implementation of the recurring channel access periods. In some other implementations, the channel access management module 1304 may synchronize its clock based on the receipt of various frames (for example, beacons or other management frames, control frames or data frames) from other APs participating in the recurring channel access periods.

If the channel access management module 1304 determines that a quiet override element indicates that the first set of wireless communication devices is permitted to contend for access during respective contention periods of each of one or more upcoming quiet periods, it then instructs the contention module 1306 to contend for access to the wireless channel during one or more of the contention periods indicated by the respective quiet elements and the quiet override element. If the contention module 1306 wins the contention during one of the contention periods, it is then the owner of a TXOP on the wireless channel during the respective communication period of the respective channel access period. The contention module 1306 may then inform the packet exchange module 1302 accordingly.

Figure 14:
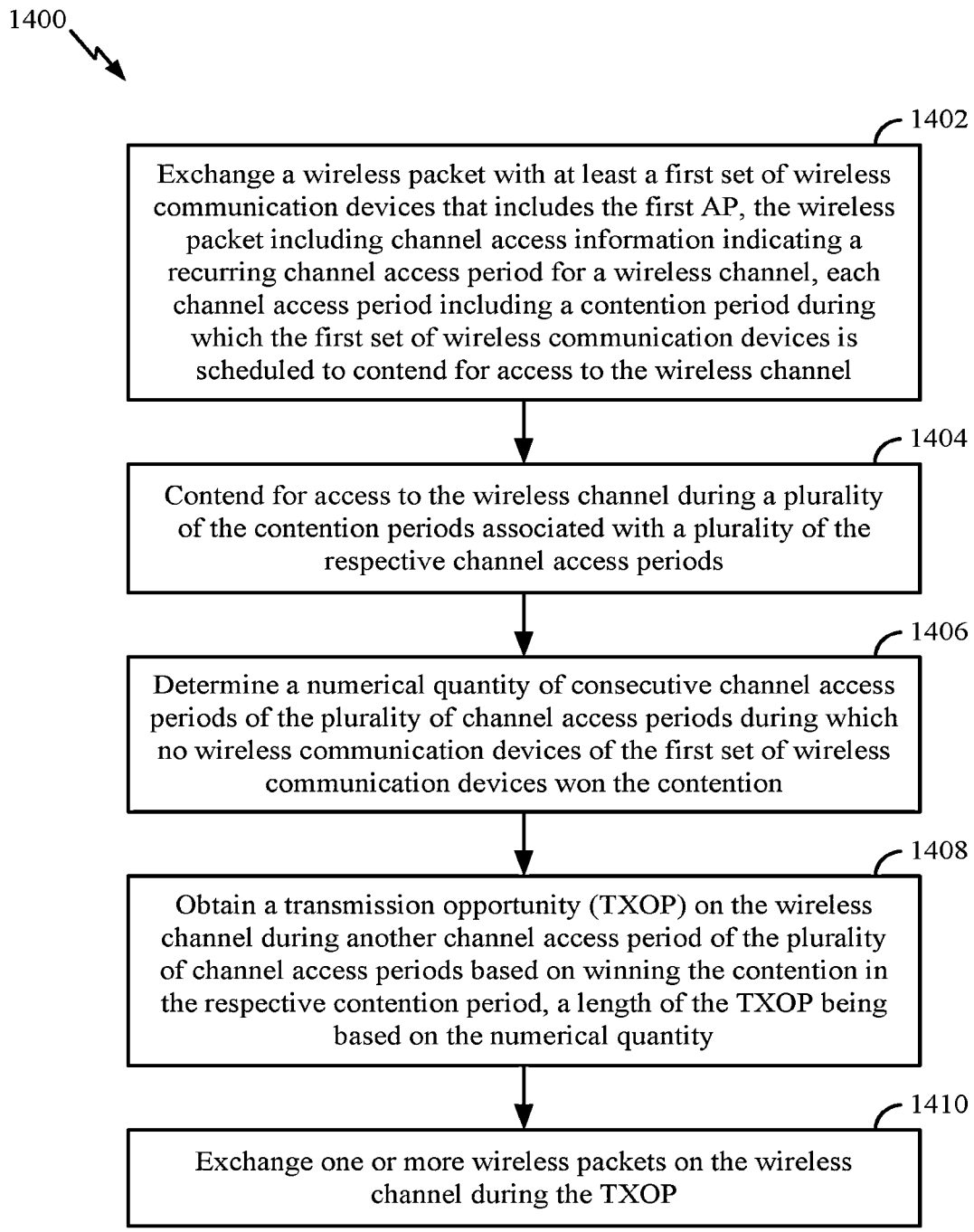
FIG. 14 shows a flowchart illustrating another example process for synchronized channel access according to some implementations.

FIG. 14 shows another flowchart illustrating an example process 1400 for synchronized channel access according to some implementations. The process 1400 may be performed by a wireless communication device such as the wireless communication device 400 described above with reference to FIG. 4. In some implementations, the process 1400 may be performed by a wireless communication device operating as or within an AP, such as one of the APs 102 and 502 described above with reference to FIGS. 1 and 5A, respectively, that is configured for synchronized channel access.

In some implementations, in block 1402, the wireless communication device exchanges a wireless packet including channel access information with at least a first set of wireless communication devices. In some implementations, the channel access information indicates a first schedule of a recurring channel access period for a wireless channel. In some such implementations, each channel access period includes a respective contention period, for example, at the start of the channel access period, during which a first set of wireless communication devices that includes the wireless communication device is scheduled to contend for access to the wireless channel. The first set of wireless communication devices are wireless communication devices that support synchronized channel access as described herein, including APs as well as STAs. For example, STAs that support synchronized channel access may also understand the channel access information and remain silent during the channel access periods unless triggered by their associated APs.

Figure 15:
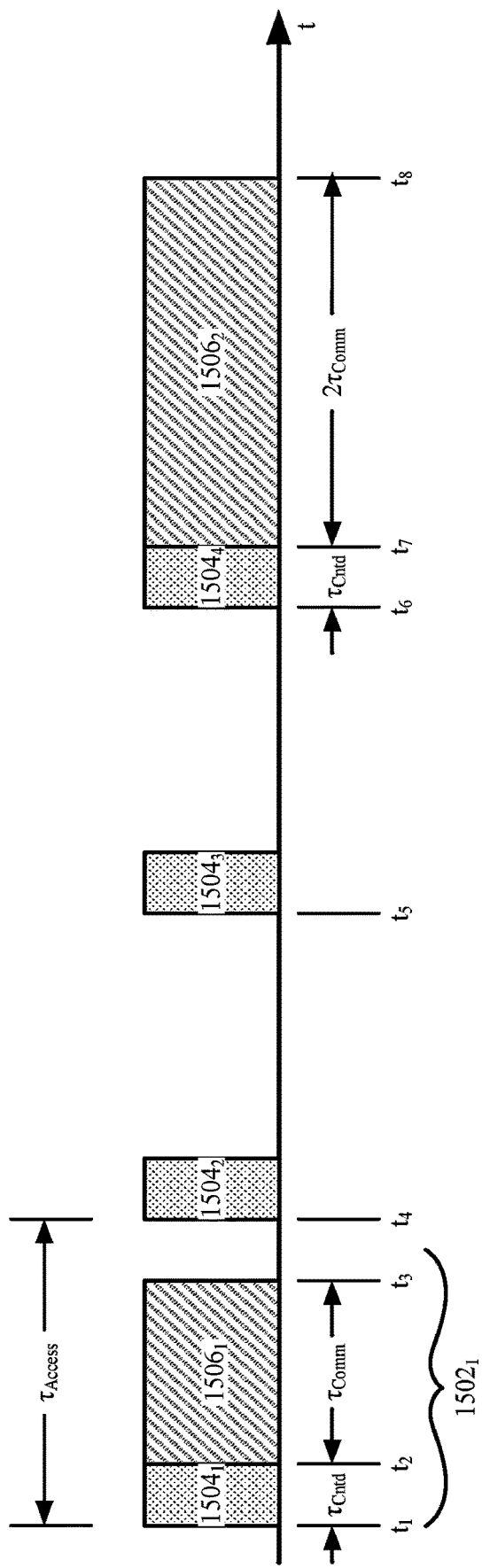
FIG. 15 shows synchronized channel access techniques according to some implementations.

FIG. 15 shows synchronized channel access techniques according to some implementations. For example, FIG. 15 shows synchronized, recurring channel access periods 1502 (for example, including a first channel access period 1502₁, a second channel access period 1502₂ and a third channel access period 1502₃). The channel access periods 1502 recur according to a time interval $\tau_{Access}$. Each channel access period 1502 includes a respective contention period 1504 (for example, contention periods 1504₁, 1504₂ and 1504₃) at the start of the channel access period and having a duration $\tau_{Cntd}$. Each channel access period 1502 may also include a respective communication period 1506 (for example, communication periods 1506₁, 1506₂ and 1506₃) having a duration $\tau_{Comm}$. Only during the contention periods 1504, at the start of the scheduled channel access periods 1502, do APs enabled for synchronized channel access, and desiring to communicate over the wireless channel, contend for access. Between adjacent channel access periods 1502, there may be open periods having duration $\tau_{Open}$ during which the wireless medium is open for regular contention-based access as governed by, for example, the CMSA/CA techniques described above.

Referring back to FIG. 14, in some implementations, exchanging the wireless packet including the channel access information with at least one other wireless communication device in block 1402 includes broadcasting, multicasting, otherwise transmitting, or receiving frames, such as management frames (for example, beacon frames or probe response frames), that include or indicate the channel access information. In some implementations or instances in which the wireless communication device may or may not be (or configured to operate within) a master (or controlling) AP, the wireless communication device may transmit the wireless packet including the channel access information to the other synchronized APs in the first set of wireless communication devices in block 1402. Alternatively, in some other implementations or instances, again, in which the wireless communication device may or may not be (or configured to operate within) a master (or controlling) AP, the wireless communication device may receive the wireless packet including the channel access information from at least one other synchronized AP in block 1402.

The channel access information may include various channel access parameters associated with the recurring channel access periods 1502 such as, for example, one or more of the relevant wireless channel or channels for which the scheduled channel access is defined, a start time of the next channel access period 1502, the time interval $\tau_{Access}$ between the starts of consecutive channel access periods 1502, the duration $\tau_{Cntd}$ of each contention period 1504, the duration $\tau_{Comm}$ of each communication period 1506, or the total duration of each channel access period 1502.

In block 1404, the wireless communication device contends for access to the wireless channel during a number of contention periods 1504. For example, in a first contention period 1504$_1$ beginning at time $t_1$, the wireless communication device contends for access and wins the contention. As a result, the wireless communication device becomes the owner of a TXOP on the wireless channel during the respective communication period 1506$_1$, which has a maximum duration $\tau_{Comm}$. The wireless communication device exchanges one or more wireless data packets on the wireless channel during the TXOP as, for example, described with reference to FIG. 12.

At time $t_2$, the wireless communication device again contends for access to the wireless channel during a second contention period 1504$_2$. However, this time the wireless communication device fails to win the contention. Indeed, in the illustrated example, none of the synchronized APs wins the contention during the second contention period 1504$_2$ due to, for example, detecting an interfering transmission from a wireless communication device that does not support or participate in the synchronized channel access. At time $t_3$, the wireless communication device again contends for access to the wireless channel during a third contention period 1504$_3$. The wireless communication device again fails to win the contention. Furthermore, none of the other synchronized APs wins the contention during the third contention period 1504$_3$, again, due to detecting an interfering transmission from a wireless communication device that does not support or participate in the synchronized channel access. In some implementations, based on failing to win the contention in the second and third contention periods 1504$_2$ and 1504$_3$, respectively, the wireless communication device may, in block 1406, determine a number (a numerical quantity; two in the illustrated example) of previous consecutive channel access periods during which no devices of the first set of wireless communication devices won the contention.

At time $t_4$, the wireless communication device again contends for access to the wireless channel during a fourth contention period 1504$_4$. This time the wireless communication device wins the contention, and as a result, becomes the owner of a TXOP 1506$_2$ on the wireless channel in block 1408. In block 1410, after obtaining the TXOP 1506$_2$, the wireless communication device may then exchange one or more wireless data packets on the wireless channel during the TXOP 1506$_2$ as, for example, described with reference to FIG. 12. However, this time the duration of the TXOP may be extended. In some implementations, the one of the synchronized APs that wins contention after one or more consecutive contention periods during which no synchronized APs won the contention, may be entitled to an extended TXOP. In some such implementations, the length of the extended TXOP may be based on the number (for example, the numerical quantity) of consecutive contention periods during which no synchronized APs won the contention. In some implementations, the length of the subsequent extended TXOP 1506$_2$ may be obtained by multiplying the normal maximum duration $\tau_{Comm}$ of the TXOP by a scaling factor. For example, the length of the extended TXOP 1506$_2$ may be an integer multiple of the normal maximum duration $\tau_{Comm}$, for example, where the value of the integer is equal to the number of determined consecutive contention periods that were missed (that is, contention periods during which no synchronized APs won the contention). In the example shown in FIG. 15, the wireless communication device winning the contention during the fourth contention period 1504$_4$ may be entitled to a subsequent TXOP 1506$_2$ having a duration that may be twice that of the normal maximum duration $\tau_{Comm}$ because two consecutive channel access periods were missed.

The first set of wireless communication devices (the APs supporting and participating in the synchronized channel access), including the wireless communication device, may be configured to determine whether an interfering transmission detected during a synchronized channel access contention period is from a device that is not participating in the synchronized channel access (that is, a device that is outside of the first set of wireless communication devices). For example, as described above, an AP may be configured to determine whether its neighboring APs and STAs support synchronized channel access by way of receiving operation or capability elements from the APs and STAs. In some implementations, the wireless communication device may determine whether a transmission detected during a synchronized channel access contention period is from a device that is participating in synchronized channel access based on identifying an address associated with the device that is indicated in the wireless transmission. Based on the address, the wireless communication device may access an internal data store to determine whether the address is associated with a device that supports synchronized channel access, for example, as previously determined based on receiving an operation or capability element from the device.

Figure 16:
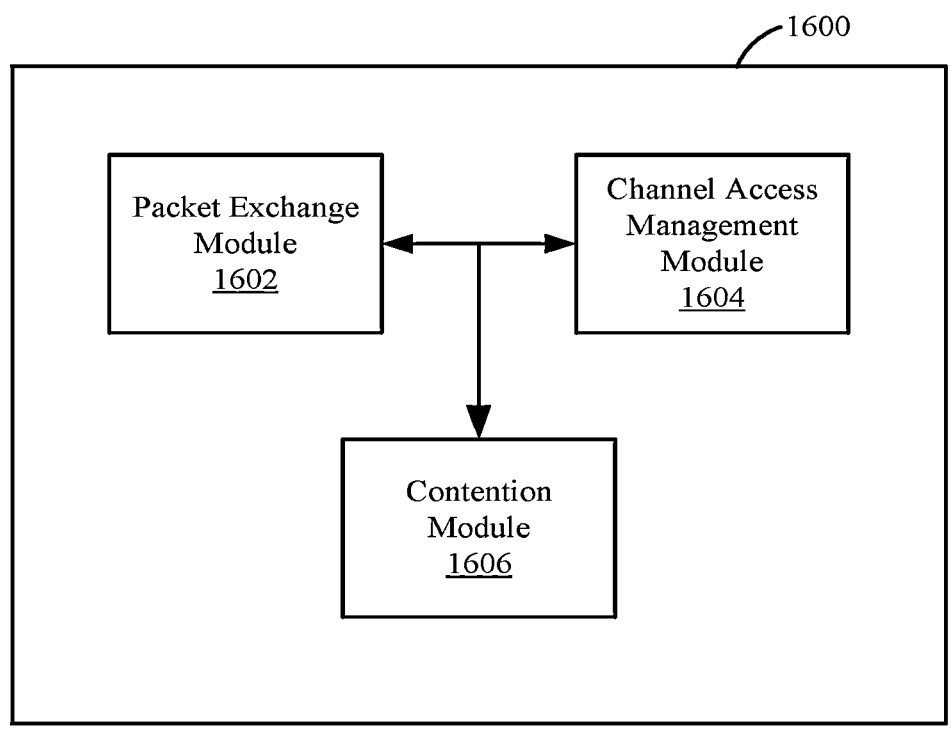
FIG. 16 shows a block diagram of an example wireless communication device according to some implementations.

FIG. 16 shows a block diagram of an example wireless communication device 1600 according to some implementations. In some implementations, the wireless communication device 1600 is configured to perform one or more of the processes 1200 and 1400 described above with reference to FIGS. 12 and 14, respectively. The wireless communication device 1600 may be an example implementation of the wireless communication device 400 described above with reference to FIG. 4. For example, the wireless communication device 1600 can be a chip, SoC, chipset, package or device that includes at least one processor and at least one modem (for example, a Wi-Fi (IEEE 802.11) modem or a cellular modem). In some implementations, the wireless communication device 1600 can be a device for use in an AP, such as one of the APs 102 and 502 described above with reference to FIGS. 1 and 5A, respectively. In some other implementations, the wireless communication device 1600 can be an AP that includes such a chip, SoC, chipset, package or device as well as at least one transmitter, at least one receiver, and at least one antenna.

The wireless communication device 1600 includes a packet exchange module 1602, a channel access management module 1604 and a contention module 1606. Portions of one or more of the modules 1602, 1604 and 1606 may be implemented at least in part in hardware or firmware. For example, the packet exchange module 1602 may be implemented at least in part by a modem (such as the modem 402). In some implementations, at least some of the modules 1602, 1604 and 1606 are implemented at least in part as software stored in a memory (such as the memory 408). For example, portions of one or more of the modules 1602, 1604 and 1606 can be implemented as non-transitory instructions (or "code") executable by a processor (such as the processor 406) to perform the functions or operations of the respective module.

The packet exchange module 1602 is configured to generate, transmit and receive PDUs including multi-user PDUs and single-user PDUs. For example, the packet exchange module 1602 can by implemented by a PHY layer and a MAC layer. The packet exchange module 1602 is generally configured to generate MPDUs and encode the MPDUs into code blocks. The code blocks may then be encoded into codewords. The packet exchange module 1602 may then map the codewords to symbols and modulate the symbols onto multiple subcarriers as a PPDU. Similarly, the packet exchange module 1602 is configured to receive PPDUs, demodulate and reverse-map the symbols to codewords, decode the codewords, and decode the MPDUs based on the decoded codewords.

The packet exchange module 1602 is configured to exchange wireless packets with at least a first set of wireless communication devices. The first set of wireless communication devices are APs that support synchronized channel access (synchronized APs). For example, the packet exchange module 1602 can be configured to perform block 1002 of the process 1000 described with reference to FIG. 10. The packet exchange module 1602 may exchange a wireless packet with at least a first set of wireless communication devices. The wireless packet includes channel access information establishing one or more recurring synchronized channel access periods.

Exchanging the wireless packet including the channel access information may include broadcasting, multicasting, otherwise transmitting, or receiving frames, such as management frames, that include or indicate the channel access information. In some implementations or instances in which the wireless communication device may or may not be (or configured to operate within) a master (or controlling) AP, the packet exchange module 1602 may, when exchanging the wireless packet, transmit the wireless packet including the channel access information to the other synchronized APs in the first set of wireless communication devices. Alternatively, in some other implementations or instances, again, in which the wireless communication device may or may not be (or configured to operate within) a master (or controlling) AP, the packet exchange module 1602 may, when exchanging the wireless packet, receive the wireless packet including the channel access information from at least one other synchronized AP.

The packet exchange module 1602 also can be configured to perform block 1204 of the process 1200 described with reference to FIG. 12. As described above, if the wireless communication device wins the contention during one of the contention periods, it is then the owner of a TXOP on the wireless channel during the respective communication period of the respective channel access period. The packet exchange module 1602 may then exchange one or more wireless data packets on the wireless channel during the TXOP. For example, the packet exchange module 1602 may transmit DL data to associated STAs. Additionally or alternatively, the packet exchange module 1602 may receive UL data from associated STAs. For example, the packet exchange module 1602 may transmit one or more trigger frames to one or more STAs allocating resources to the STAs for UL transmissions, and in response, receive one or more wireless packets from each of the one or more stations including UL data.

The channel access management module 1604 is configured to extract channel access information from the wireless packet. The channel access information may include various channel access parameters associated with the recurring channel access periods such as, for example, one or more of the relevant wireless channel or channels for which the scheduled channel access is defined, a start time of the next channel access period, the time interval $\tau_{Access}$ between the starts of consecutive channel access periods, the duration $\tau_{Cntd}$ of each contention period, the duration $\tau_{Comm}$ of each communication period, or the total duration of each channel access period.

In some implementations, the channel access management module 1604 is generally configured to instruct the packet exchange module 1602 when to transmit wireless packets establishing synchronized channel access. The channel access management module 1604 is also configured to identify contention periods in recurring channel access periods and to instruct the contention module 1606 when to contend for access. The channel access management module 1604 may further be configured to instruct the packet exchange module 1602 when to transmit wireless data packets during respective communication periods of the channel access periods.

In some implementations, the channel access management module 1604 is further configured to synchronize a clock with a clock of other APs for facilitating synchronized channel access. For example, the packet exchange module 1602 may receive one or more explicit synchronization signals from either a dedicated controller or another AP operating as a master AP. The channel access management module 1604 may synchronize its clock based on the synchronization signals to facilitate the implementation of the recurring channel access periods. In some other implementations, the channel access management module 1604 may synchronize its clock based on the receipt of various frames (for example, beacons or other management frames, control frames or data frames) from other APs participating in the recurring channel access periods.

If the channel access management module 1604 determines that a contention period of a synchronized channel has begun, it then instructs the contention module 1606 to contend for access to the wireless channel. If the contention module 1606 does not win the contention during a contention period then, in some implementations, the channel access management module 1604 may determine a number (a numerical quantity) of previous consecutive channel access periods during which no devices of the first set of wireless communication devices won the contention.

If the contention module 1606 wins the contention during a contention period, it is then the owner of a TXOP on the wireless channel during the respective communication period of the respective channel access period. In some implementations, if the contention module 1606 wins the contention after one or more consecutive contention periods during which no synchronized APs won the contention, it may determine an extended TXOP for the communication period and inform the packet exchange module 1602 accordingly. In some such implementations, the length of the extended TXOP may be based on the number (for example, the numerical quantity) of consecutive contention periods during which no synchronized APs won the contention. In some implementations, the length of the subsequent extended TXOP $1506_2$ may be obtained by multiplying the normal maximum duration $\tau_{Comm}$ of the TXOP by a scaling factor. For example, the length of the extended TXOP $1506_2$ may be an integer multiple of the normal maximum duration $\tau_{Comm}$, for example, where the value of the integer is equal to the number of determined consecutive contention periods that were missed (that is, contention periods during which no synchronized APs won the contention).

The channel access management module 1604 may be further configured to determine whether an interfering transmission detected during a synchronized channel access contention period is from a device that is not participating in the synchronized channel access (that is, a device that is outside of the first set of wireless communication devices). For example, as described above, an AP may be configured to determine whether its neighboring APs and STAs support synchronized channel access by way of receiving operation or capability elements from the APs and STAs. In some implementations, the channel access management module 1604 may determine whether a transmission detected during a synchronized channel access contention period is from a device that is participating in synchronized channel access based on identifying an address associated with the device that is indicated in the wireless transmission. Based on the address, the channel access management module 1604 may determine whether the address is associated with a device that supports synchronized channel access, for example, as previously determined based on receiving an operation or capability element from the device.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless access point (AP), comprising:
    transmitting or receiving a management frame that includes:
        a quiet element indicating at least one quiet period during which wireless stations (STAs) of a first type and a second type are not permitted to transmit on a wireless channel, and
        a target wake time (TWT) element indicating a schedule of wake periods during which a group of wireless STAs of the second type are to be awake, the at least one quiet period at least partially overlapping at least one of the wake periods, the TWT element indicating to the group of wireless STAs of the second type that they can receive a downlink communication from the wireless AP, or transmit an uplink communication to the wireless AP responsive to a trigger frame received from the wireless AP, during the wake periods, including the at least one wake period, despite the at least one quiet period at least partially overlapping the at least one wake period; and
    transmitting a first downlink communication to at least one wireless STA of the second type during the at least one wake period at a time during the at least one quiet period.

2. The method of claim 1, wherein the quiet element includes a field indicating a periodicity of the at least one quiet period, a field indicating a duration of the at least one quiet period, and a field indicating a start of the at least one quiet period.

3. The method of claim 1, wherein the wireless AP is associated with a first basic service set (BSS) color, the method further comprising:
    detecting a wireless transmission from a wireless communication device of the first type during the at least one wake period;
    identifying a second BSS color associated with the wireless communication device; and wherein the transmission of the downlink communication is based on determining that the second BSS color is different than the first BSS color.

4. The method of claim 1, wherein the first downlink communication is a trigger frame that triggers the at least one wireless STA to transmit a first uplink communication to the wireless AP during the at least one wake period.

5. A method for wireless communication by a wireless station (STA), comprising:
receiving, from a wireless access point (AP), a management frame that includes:
a quiet element indicating at least one quiet period during which wireless stations (STAs) of a first type and a second type are not permitted to transmit on a wireless channel, the wireless STA being of the second type, and
a target wake time (TWT) element indicating a schedule of wake periods during which a group of wireless STAs of the second type, including the wireless STA, are to be awake, the at least one quiet period at least partially overlapping at least one of the wake periods, the TWT element indicating to the group of wireless STAs of the second type that they can receive a downlink communication from the wireless AP, or transmit an uplink communication to the wireless AP responsive to a trigger frame received from the wireless AP, during the wake periods, including the at least one wake period, despite the at least one quiet period at least partially overlapping the at least one wake period; and
receiving a first downlink communication from the wireless AP, or transmitting a first uplink communication to the wireless AP responsive to a trigger frame received from the wireless AP, during the at least one wake period at a time during the quiet period.

6. The method of claim 5, wherein the quiet element includes a field indicating a periodicity of the at least one quiet period, a field indicating a duration of the at least one quiet period, and a field indicating a start of the at least one quiet period.

7. A wireless access point (AP), comprising:
at least one memory;
at least one processor communicatively coupled with the at least one memory, the at least one processor operable to cause the wireless AP to:
transmit or receiving a management frame that includes:
a quiet element indicating at least one quiet period during which wireless stations (STAs) of a first type and a second type are not permitted to transmit on a wireless channel, and
a target wake time (TWT) element indicating a schedule of wake periods during which a group of wireless STAs of the second type are to be awake, the at least one quiet period at least partially overlapping at least one of the wake periods, the TWT element indicating to the group of wireless STAs of the second type that they can receive a downlink communication from the wireless AP, or transmit an uplink communication to the wireless AP responsive to a trigger frame received from the wireless AP, during the wake periods, including the at least one wake period, despite the at least one quiet period at least partially overlapping the at least one wake period; and
transmit a first downlink communication to at least one wireless STA of the second type during the at least one wake period at a time during the at least one quiet period.

8. The wireless AP of claim 7, wherein the quiet element includes a field indicating a periodicity of the at least one quiet period, a field indicating a duration of the at least one quiet period, and a field indicating a start of the at least one quiet period.

9. The wireless AP of claim 7, wherein the wireless AP is associated with a first basic service set (BSS) color, the processor further operable to cause the wireless AP to:
detect a wireless transmission from a wireless communication device of the first type during the at least one wake period;
identify a second BSS color associated with the wireless communication device; and
wherein the transmission of the downlink communication is based on determining that the second BSS color is different than the first BSS color.

10. The wireless AP of claim 7, wherein the first downlink communication is a trigger frame that triggers the at least one wireless STA to transmit a first uplink communication to the wireless AP during the at least one wake period.

11. A wireless station (STA), comprising:
at least one memory;
at least one processor communicatively coupled with the at least one memory, the at least one processor operable to cause the wireless STA to:
receive, from a wireless access point (AP), a management frame that includes:
a quiet element indicating at least one quiet period during which wireless stations (STAs) of a first type and a second type are not permitted to transmit on a wireless channel, the wireless STA being of the second type, and
a target wake time (TWT) element indicating a schedule of wake periods during which a group of wireless STAs of the second type, including the wireless STA, are to be awake, the at least one quiet period at least partially overlapping at least one of the wake periods, the TWT element indicating to the group of wireless STAs of the second type that they can receive a downlink communication from the wireless AP, or transmit an uplink communication to the wireless AP responsive to a trigger frame received from the wireless AP, during the wake periods, including the at least one wake period, despite the at least one quiet period at least partially overlapping the at least one wake period; and
receive a first downlink communication from the wireless AP, or transmit a first uplink communication to the wireless AP responsive to a trigger frame received from the wireless AP, during the at least one wake period at a time during the quiet period.

12. The wireless STA of claim 11, wherein the quiet element includes a field indicating a periodicity of the at least one quiet period, a field indicating a duration of the at least one quiet period, and a field indicating a start of the at least one quiet period.

* * * * *